United States Patent
Pinheiro et al.

(10) Patent No.: US 10,645,549 B2
(45) Date of Patent: May 5, 2020

(54) ENHANCED SUPPORT VEHICLE-TO-ANYTHING (V2X) COMMUNICATION

(71) Applicant: Intel IP Corporation, Santa Clara, CA (US)

(72) Inventors: Ana Lucia Pinheiro, Hillsboro, OR (US); Dave Cavalcanti, Beaverton, OR (US); Meghashree Dattatri Kedalagudde, Hillsboro, OR (US)

( * ) Notice: Subject to any disclaimer, the term of this patent is extended or adjusted under 35 U.S.C. 154(b) by 0 days.

(21) Appl. No.: 15/577,292

(22) PCT Filed: Dec. 24, 2015

(86) PCT No.: PCT/US2015/000358
§ 371 (c)(1),
(2) Date: Nov. 27, 2017

(87) PCT Pub. No.: WO2016/209196
PCT Pub. Date: Dec. 29, 2016

(65) Prior Publication Data
US 2018/0152819 A1 May 31, 2018

Related U.S. Application Data

(60) Provisional application No. 62/183,936, filed on Jun. 24, 2015.

(51) Int. Cl.
*H04W 4/40* (2018.01)
*H04W 4/80* (2018.01)
(Continued)

(52) U.S. Cl.
CPC .............. *H04W 4/40* (2018.02); *H04L 69/22* (2013.01); *H04W 4/02* (2013.01); *H04W 4/80* (2018.02)

(58) Field of Classification Search
CPC ........ H04L 69/22; H04W 4/02; H04W 4/046; H04W 4/40; H04W 4/44; H04W 4/46; H04W 4/48; H04W 4/80; G08G 1/00
See application file for complete search history.

(56) References Cited

U.S. PATENT DOCUMENTS

2008/0095134 A1* 4/2008 Chen .................... H04B 7/2606
370/342
2016/0374139 A1* 12/2016 Chen ...................... H04L 47/29
(Continued)

OTHER PUBLICATIONS

Kato et al.; "Enabling Vehicular Safety Applications over LTE Networks"; In: International Conference on Connected Vehicles and Expo, ICCVE 2013—Proceedings; (Dec. 2-6, 2013); pp. 747-752; Las Vegas, NV, USA; IEEE; <doi: 10.1109/ICCVE.2013.6799889 >.

(Continued)

*Primary Examiner* — Kan Yuen

(57) ABSTRACT

Technology for eNodeB operable to perform vehicle-to-anything (V2X) communication within a wireless communication network is disclosed. The eNodeB can Process a data packet containing vehicle-to-anything (V2X) identification information that is received from a user equipment (UE). The eNodeB can identify the data packet as a V2X message according to the V2X identification information. The eNodeB can determine the V2X messages are to be forwarded to a V2X function. The eNodeB can process the V2X message for transmission directly to the V2X function via a V2X interface.

15 Claims, 14 Drawing Sheets

(51) Int. Cl.
*H04L 29/06* (2006.01)
*H04W 4/02* (2018.01)

(56) References Cited

U.S. PATENT DOCUMENTS

| | | | | |
|---|---|---|---|---|
| 2018/0049104 | A1* | 2/2018 | Van Phan | H04W 76/14 |
| 2018/0063852 | A1* | 3/2018 | Kang | H04W 72/10 |
| 2018/0077668 | A1* | 3/2018 | Chun | H04W 4/046 |
| 2018/0109937 | A1* | 4/2018 | Lee | H04W 4/046 |

OTHER PUBLICATIONS

Toukabri Gunes et al.; "Hybrid Model for LTE Network-Assisted D2D Communications"; In: Lecture Notes in Computer Science; (Jan. 2014); pp. 100-113; vol. 8487; <doi: 10.1007/978-3-319-07425-2_8>.

International search report dated Jun. 4, 2016; in International Application No. PCT/US2015/000358; filed Dec. 24, 2015; 5 pages.

3GPP TS 23.401; "3$^{rd}$ Generation Partnership Project; Technical Specification Group Services and System Aspects; General Packet Radio Service (GPRS) Enhancements for Evolved Universal Terrestrial Radio Access Network (E-UTRAN) Access;" (Sep. 2014); 306 pages; V12.6.0 (Release 12).

Rapporteur; "Proposed Editorial Changes for Technical Report of FS_V2XLTE;" 3GPP TSG S1-151331; (Apr. 13-17, 2015); 20 pages; SA WG1 Meeting #70, Los Cabos, Mexico; Revision of S1-151092 (Agenda: 8.7 FS_V2XLTE: LTE Support for V2X Services).

IEEE Standard 802.11a-1999: Telecommunications and information exchange between systems-Local and metropolitan area networks-Specific requirements—Part 11: Wireless LAN Medium Access Control (MAC) and Physical Layer (PHY) specifications: High-speed Physical Layer in the 5 GHZ Band; 1999.

Araniti, et al.; IEEE: LTE for Vehicular Networking: A Survey; May 2013.

Finnie; White Paper: The New DPI: Challenges & Opportunities In The LTE Era; Heavy Reading; Jan. 2011.

FCC 06-110: Amendment of the Commission's Rules Regarding Dedicated Short-Range Communication Services in the 5.850-5.925 GHz Band (5.9 GHz Band); Jul. 26, 2006.

Toukabri Gunes, et al.; Hybrid model for LTE Network-Assisted D2D communications; France.

Kato, et al.; Enabling Vehicular Safety Applications over LTE Networks; Hitachi Ltd., Yokohama Research Laboratory, AT&T Labs.

IEEE: Draft Guide for Wireless Access in Vehicular Environments (WAVE) Architecture; P1609.0/D2; 2016.

3GPP TR 22.885 V0.1.1 (Apr. 2005); Technical Specification Group Services and System Aspects; Study on LTE Support for V2X Services (Release 14) (Apr. 2015).

3GPP TR 22.885 V14.0.0; Technical Specification Group Services and System Aspects; Study on LTE support for Vehicle to Everything (V2X) services (Release 14) (Dec. 2015).

3GPP TS 23.303 V13.0.0; Technical Specification Group Services and System Aspects; Proximity-based services (ProSe); Stage 2 (Release13) (Jun. 2015).

* cited by examiner

ENHANCED SUPPORT VEHICLE-TO-ANYTHING (V2X) COMMUNICATION

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi. In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In addition, devices, including those within one or more vehicles, employing wireless communication systems and methods (e.g., cellular telephones, mobile computers and other mobile devices) are increasingly prevalent. The increase in number of mobile devices has increased the capacity demand and load on cellular networks. Typical cellular networks include stationary cellular antennas (e.g., a cellular tower, such as an eNB, including multiple cellular antennas), which may broadcast to and receive signals from mobile devices to facilitate communication between mobile devices. Also, vehicle-to-anything (V2I), Vehicle-to-vehicle (V2V), and/or Vehicle-to-pedestrian (V2P) communication (subsumed as vehicle-to-X or simply "V2X communication") is the enabling technology for intelligent transport systems (ITS). ITS systems are configured to automate interactions between vehicles in order to achieve, for example, greater levels of communication, safety, security and efficiency. ITS covers a variety of use cases with different constraints on the communication capabilities of the car, including active road safety, traffic efficiency, local services and ubiquitous Internet services including multimedia services).

While the telecommunication infrastructure is to some extent already capable of fulfilling the constraints of certain uses cases (e.g. for some Internet applications), other use cases, particularly in V2X communications, are more demanding and desire additional enhancements of the current communication infrastructure. Moreover, current scalability, deployment, functionality, and protocols for V2X communication are inefficient to meet the current demands.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
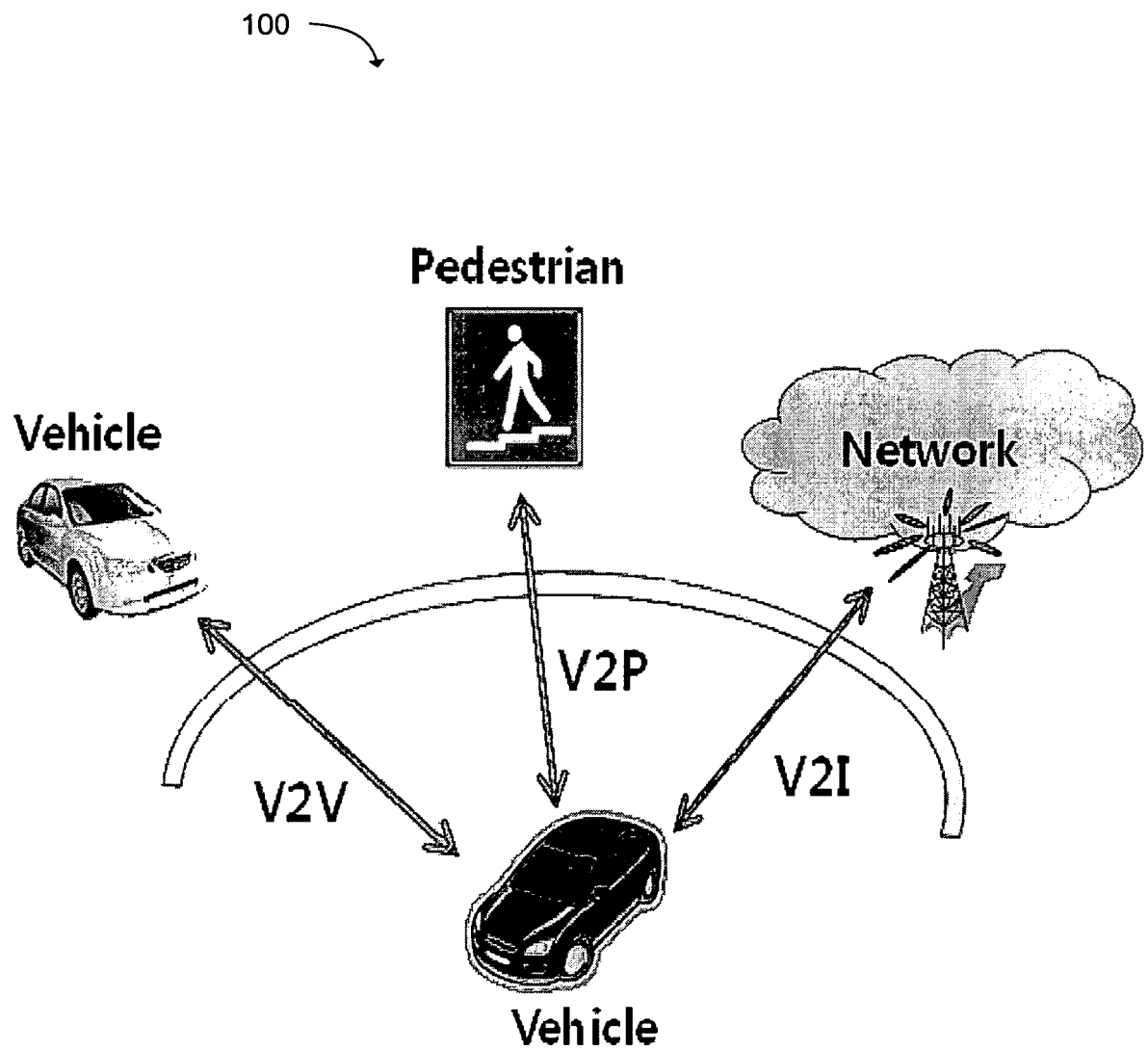
FIG. 1 depicts a V2X communication for vehicle-to-network (V2I), Vehicle-to-vehicle (V2V), and Vehicle-to-person (V2P) in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element.

Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Intelligent Transportation Systems (ITS) can be enabled by connected vehicles to improve safety and efficiency in roadways. In order to provide wireless access in vehicular environments, a wireless Access Vehicular Environment (WAVE) system architecture is provided. A WAVE system can consist of road side units (RSUs). The RSUs and mobile terminals may form WAVE basic service sets (WBSSs) connected to the Wide Area Network (WAN) via an appropriate portal. Also, the Wireless Access in Vehicular Environments (WAVE) architecture and standards can support ITS safety and non-safety applications. The WAVE standards can be based on IEEE 802.11p (e.g. Dedicated Short Range Communications "DSRC"), to support Vehicle-to-Anything (V2X) communications, which can include V2X communication for vehicle-to-network (V2I), Vehicle-to-vehicle (V2V), and Vehicle-to-person/pedestrian (V2P) communications.

The DSRC/802.11p can supports short-range and low power communication in the 5.9 GHz spectrum, which has been dedicated for ITS. However, some ITS applications use the deployment of DSRC/802.11p-based Road Side Units (RSU), which can impose scalability and deployment cost challenges. Despite of the standards and dedicated spectrum, DSRC/802.11p based ITS applications have not been widely deployed.

Existing cellular systems, such as third generation partnership project (3GPP) long term evolution (LTE), can be used as an alternative to DSRC/802.1I p given its large scale coverage and efficient spectrum utilization. However, one of the issues in 3GPP LTE is that the system was mostly developed for IP communication over the internet. Also, direct communication between devices can be provided in Proximity-based Services (ProSe). Proximity-based Service (ProSe) utilized in a user equipment (UE), an evolved Node B (eNB) and a mobility management entity (MME) in wireless communications systems. However, existing ProSe architecture and protocols have been mainly limited to public safety (e.g., voice communication between emergency responders) and consumer applications (e.g. advertisement, location information, social networks). Therefore, existing LTE ProSe functionality and protocols are not scalable to efficiently to meet the constraints of V2X communications in terms of latency and number of vehicles supported.

Thus, the present technology provides for an eNodeB operable to perform vehicle-to-anything (V2X) communication within a wireless communication network is disclosed. The eNodeB can Process a data packet containing vehicle-to-anything (V2X) identification information that is received from a user equipment (UE). The eNodeB can identify the data packet as a V2X message according to the V2X identification information. The eNodeB can determine if each of the V2X messages are to be forwarded to a V2X function. The eNodeB can process the V2X message for transmission directly to the V2X function via a V2X interface or process the V2X message for transmission directly to the V2X function via a V2X interface or perform one of broadcast, multicast, or unicast the V2X message to the cell.

In one aspect, the present technology provides an eNodeB operable to performing vehicle-to-anything (V2X) communication within a wireless communication network is disclosed. The eNodeB can identify a data packet transmitted from a user equipment (UE) as a V2X message. The eNodeB can determine the V2X message is to be broadcasted within a cell or forwarded to an V2X function via a V2X interface. The eNodeB can process the V2X message for transmission directly to the V2X function via a V2X interface or process the V2X message for transmission directly to the V2X function via a V2X interface or perform one of broadcast, multicast, or unicast the V2X message to the cell.

In an additional aspect, the present technology provides for a vehicle-to-anything (V2X) function to perform vehicle-to-anything (V2X) communication within a wireless communication network is disclosed. The V2X function can process a vehicle-to-anything (V2X) message containing V2X identification information that is received directly from an eNodeB via a V2X interface. The V2X function can add an internet protocol (IP) address of a V2X application server. The V2X function can process the V2X message for transmission to the eNodeB to enable the V2X message to be sent to the V2X application server. However, if the V2X message is to be sent to the Application server, the V2X function does not send the V2X message back to the eNB. Rather, the V2X function can send the V2X message to the eNB in case the V2X message is to be sent back into the cell, i.e., to one or more UEs.

It should be noted that as used herein, a V2X Service can be a type of communication service that involves a transmission or receiving a user equipment (UE) using a V2X application. Based on the other party (e.g., vehicle or UE) involved in the communication, the V2X Service can be further divided into V2V Service, V2I Service, and V2P service. A V2I Service can be type of V2X Service, where one party can be a UE and the other party can be an road side unit (RSU) both using V2I application. A V2V service can be a type of V2X Service, where both parties of the communication can be UEs using V2V application. A V2P service can be type of communication service that involves a UE supporting both V2V and V2P service and a UE supporting only V2P service. A Road Side Unit (RSU) can be an entity supporting the V2I Service that can transmit to, and receive from, a UE using V2I application. A RSU can be implemented in an eNodeB and/or a stationary UE.

FIG. 1 depicts a V2X communication system 100 for vehicle-to-network (V2I), Vehicle-to-vehicle (V2V), and Vehicle-to-person (V2p) in accordance with an example. As depicted, the V2X communication system 100 includes vehicle-to-network (V2I), Vehicle-to-vehicle (V2V), and Vehicle-to-person/pedestrian (V2P) each having communication devices that autonomously communicate with one another for providing global positioning and other safety-related information for making their presence heading, proximity, or other positional-related information known to one another. It should be understood that the term pedestrian used herein includes a pedestrian standing, walking, jogging, or a person utilizing a non-automobile form of transportation (e.g., bicycle) that is positioned in the road or in close proximity to the road.

The V2X communication system 100 can include one or more processors and (e.g., a V2X communication device) for controlling the communication with a vehicle, a pedestrian, and/or a network. For example, the V2X communication system 100 can include an on-board computer that may be used to communicate data messages between a vehicle, a pedestrian, and/or a network via a transmitter and receiver, or similar device for receiving and transmitting data messages and files. A dedicated short range communication protocol (DSRC) can be used to provide data transfer between a vehicle, a pedestrian, and/or a network. Moreover, the V2X communication system 100 can include a user equipment (UE), that can communicate with an eNodeB to provide data transfer between vehicles, a pedestrian, and/or a network. The network may be a cell having one or more UEs and one or more eNodeBs. That is, a "cell" can refer to a particular geographic coverage area of an eNodeB and/or an eNodeB subsystem serving the coverage area.

Figure 2:
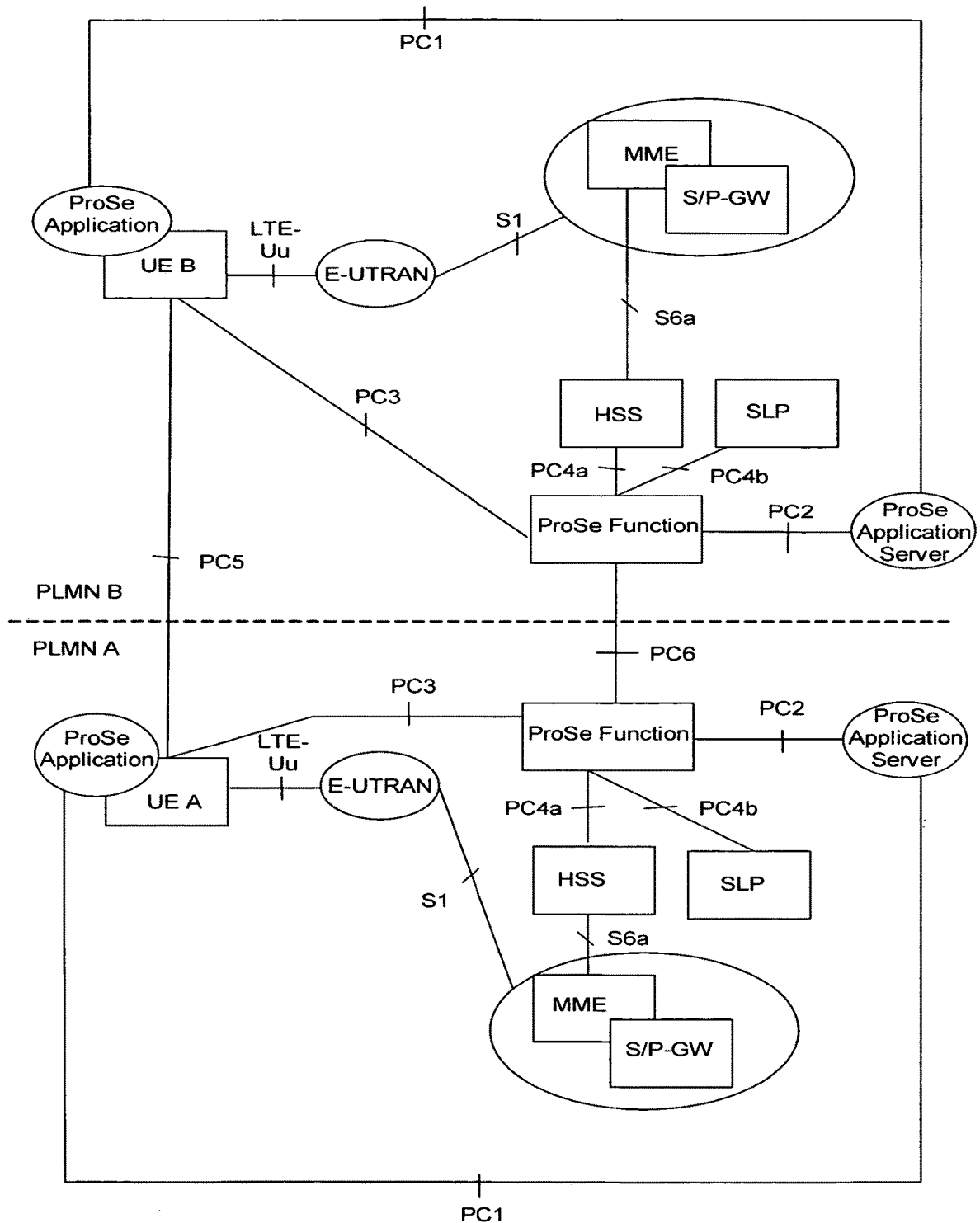
FIG. 2 illustrates a public land mobile network (PLMN) architecture in accordance with an example.

FIG. 2 illustrates a public land mobile network (PLMN) architecture in accordance with an example. FIG. 2 depicts a Proximity-based Service (ProSe) communication system 200 developed as a technology which allows UEs to directly communicate with each other in close proximity without transmitting/receiving data and/or control signals to the other via an eNB, which means a local or direct path can be used between the UEs. That is, FIG. 2 depicts PLMN A, PLMN B, user equipment (UE) A, UE B, a mobility management unit (MME), an evolved universal terrestrial radio access network (E-UTRAN), a ProSe function, a subscriber servicer (HSS), a secure user plane location (SUPL) Location Platform (SLP), a ProSe application server, and serving gateway (SGW) and/or a packet data network (PDN) gateway (PGW) (e.g., S/P-GW).

The ProSe function can be a logical function that can be used for network related actions used for ProSe. The ProSe function can play different roles for each of the features of ProSe. In 3GPP TS 23.303 release 12 it is assumed that there is only one logical ProSe Function in each PLMN that supports Proximity Services. It should be noted that if multiple ProSe Functions are deployed within the same PLMN (e.g., for load reasons), then the method to locate the ProSe Function that has allocated a specific ProSe Application Code (e.g. through a database lookup, etc.) is not defined in this version of the specification.

PC1 can be a reference point between the ProSe application in the UE and in the ProSe Application Server. PC1 can be used to define application level signalling constraints. PC2 can be reference point between the ProSe Application Server and the ProSe Function. PC2 can be used to define the interaction between ProSe Application Server and ProSe functionality provided by the 3GPP EPS via ProSe Function (e.g. name translation) for an evolved packet core (EPC)-level ProSe discovery. PC3 can be a reference point between the UE and the ProSe Function. PC3 can rely on an EPC user plane for transport (i.e. an "over internet protocol (IP)" reference point). It is used to authorize ProSe Direct Discovery and EPC-level ProSe Discovery requests, and perform allocation of ProSe Application Codes corresponding to ProSe Application Identities used for ProSe Direct Discovery. PC3 can be used to define the authorization policy per PLMN for ProSe Direct Discovery (for Public Safety and non-Public Safety) and communication (for Public Safety only) between UE and ProSe Function. PC4a can be reference point between the HSS and ProSe Function. PC4a can be used to provide subscription information in order to authorize access for ProSe Direct Discovery and ProSe Direct Communication on a per PLMN basis. PC4a can also be used by the ProSe Function (i.e. EPC-level ProSe Discovery Function) for retrieval of EPC-level ProSe Discovery related subscriber data.

PC4b can be a reference point between a secure user plane location (SUPL) Location Platform (SLP) and the ProSe Function. PC4b can be used by the ProSe Function (i.e. EPC-level ProSe Discovery Function) (in the role of LCS client to query the SLP). PC5 can be a reference point between ProSe-enabled UEs used for control and user plane for ProSe Direct Discovery, ProSe Direct Communication and ProSe UE-to-Network Relay.

PC6 can be a reference point between ProSe Functions in different PLMNs (EPC-level ProSe Discovery) or between the ProSe Function in the HPLMN and the ProSe Function in a Local PLMN (ProSe Direct Discovery). With ProSe Direct Discovery, the PC6 reference point can be used for home public land mobile network (HPLMN) control of ProSe service authorization. PC6 can also be used to authorize ProSe Direct Discovery requests, retrieve the Discovery Filter(s) corresponding ProSe Application identification (ID) name(s) and translate the ProSe Application Code to the ProSe Application ID Name.

In addition to the relevant functions defined in 3GPP TS 23.401 for S6a, ProSe S6a can be used to download ProSe related subscription information to mobility management unit (MME) during evolved universal terrestrial radio access network (E-UTRAN) attach procedure or to inform the MME subscription information in the HSS has changed. In addition to the relevant functions defined in 3GPP TS 23.401 for S1-MME, ProSe S1-MME can be also used to provide an indication to eNB that the UE is authorized to use ProSe Direct Discovery.

The V2X services can use the ProSe/device-to-device (D2D) architecture with necessary enhancements to support transmission of V2X safety messages. Thus, the present technology provides enhancements necessary to optimize the ProSe architecture to support V2X service constraints. More specifically, the present technology describes broadcast functionality that can be replaced by a multicast functionality.

In one aspect, the RSU functionality in 3GPP can be implemented either in the eNodeB (or "eNB") or in a UE. Also, the eNB can include one or more constraints such that the V2I message generated by a UE supports the V2I Service delivers the V2I message to other UEs via one or more eNB(s) within 100 milliseconds (ms) with reduced delivery power loss.

Figure 3:
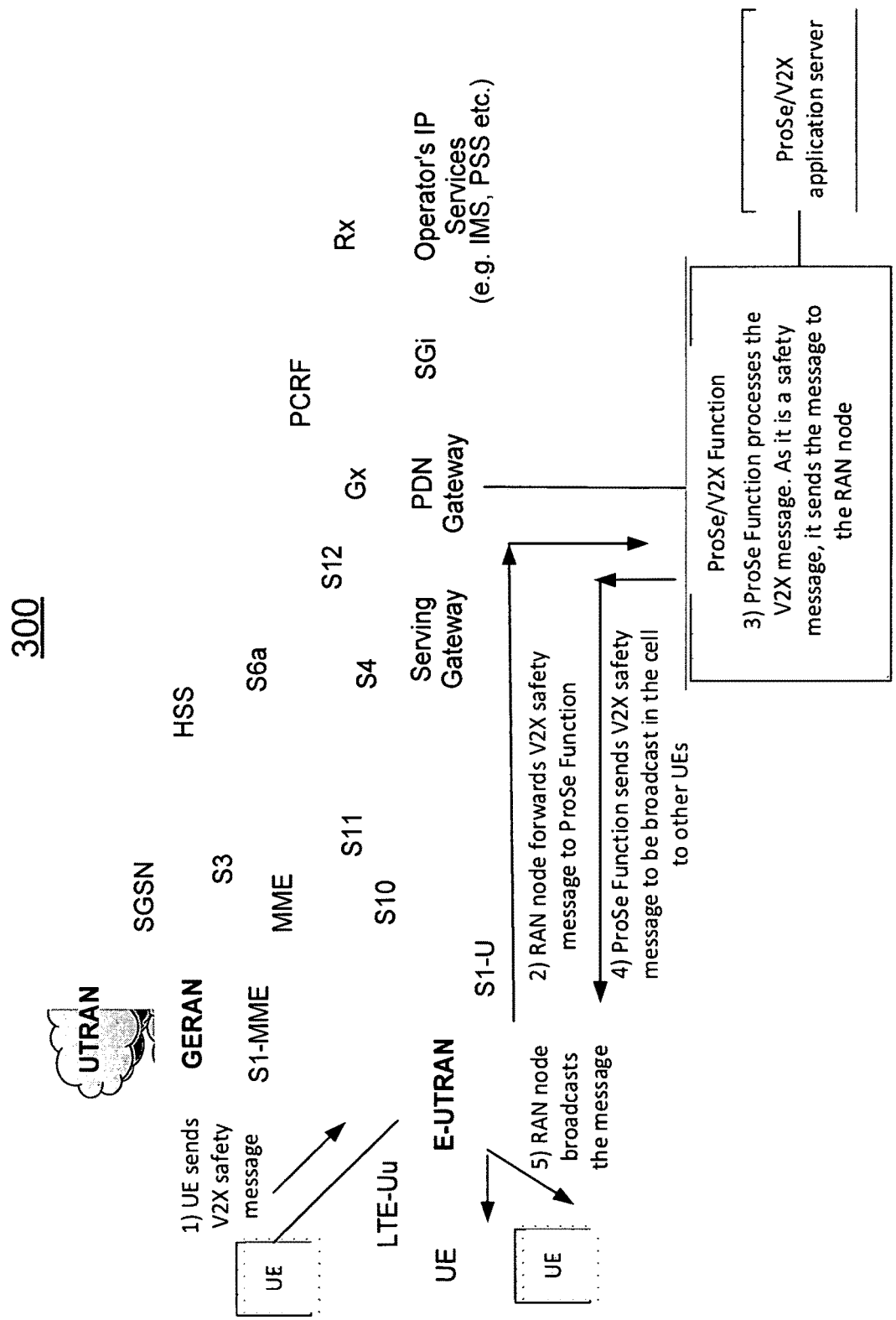
FIG. 3 illustrates a first example V2X communication between a user equipment (UE) and a ProSe function via a PC3 interface in accordance with an example.

Turning now to FIG. 3, an example of V2X communication between a user equipment (UE) and a ProSe function via a PC3 interface in accordance with an example. In one aspect, the V2X communication between the UE and the ProSe function can be done via the PC3 interface. The eNB relays the PC3 messages towards the ProSe function. However, as depicted in FIG. 3, the eNB sends internet protocol (IP) packets over an IP tunnel over the S1-U interface which is then forwarded to the ProSe function (i.e., packets are sent over the user plane to the P-GW and from the P-GW to the ProSe function). That is, 1) the UE sends the V2X safety message to the eNB (e.g., the E-UTRAN or radio access node "RAN" node, 2) the eNB forwards the V2X safety message to the ProSe function via the serving gateway/PDN gateway, 3) the ProSe function processes the V2X safety message and sends the V2X safety message to back to the eNB, 4) the ProSe function sends the V2X safety message to be broadcasted in the cell to the UEs within the cell, and 5), the eNB broadcasts the V2X safety message.

It should be noted that if the packets are supposed to be broadcast in the cell, the transmission to the ProSe function in the user plane may cause additional delay and also add extra traffic in the core network. It should be noted are two cases: 1) case 1—the UE is sending V2X messages to the network using an air (Uu) interface and the RAN node decides to forward these messages in the cell (and/or to other RAN nodes), and 2) case 2—the UE is sending V2V messages over the D2D channel (e.g., sidelink channels or other channels that could be defined for V2X communication) and the eNB listens to the D2D channel and receives the V2X safety message. The eNB can decide to send the message in the cell for UEs that may not have received the V2X safety message directly from the UE and/or forwards the V2X safety message to other eNBs to be broadcast in other cells. In both case 1 and case 2, the eNB can be operating as an RSU.

An RSU shall be able to be configured for transmission of V2X messages to a UE supporting V2X Service as requested by the V2X service layer. When requested by the V2X service layer, an RSU shall be able to deliver V2X messages to a traffic safety server and/or UEs supporting V2X Service and/or to other RSUs.

In one aspect, the present technology provides at least two constraints at the eNB. That is, constraint 1) the eNB supports the V2I Service and delivers the V2I message, generated by a UE, to other UEs via one or more eNB(s) within 100 milliseconds (ms) with reduced delivery power loss. Constraint 2) the eNB can be an RSU, especially for small cell eNBs, and the eNB supports the forwarding of user plane messages in the cell to other UEs and to other eNBs via a new V2X interface. That is, the new interface can be between the eNB/RSU and the ProSe/V2X function. Existing interfaces can be used to forward messages to UEs and other eNBs. It should be noted that the ProSe/V2X Function can be a V2X specific functionality that may be part of the ProSe function or stand alone.

The V2X interface can be direct interface between eNB (e.g., a RSU) and the ProSe/V2X function. In one aspect, a sub-set implementation of the ProSe/V2X function can be near or within the eNB/RSU. In one aspect, the RSU can be a virtual implementation. The UE can add V2X information in a header of a data packet that allows the eNB/RSU to decide if a V2X message is to be broadcast in the cell or sent directly to the ProSe/V2X Function in a core Network. The added V2X information can added in a media access control (MAC) (over Uu or PC5), radio link control (RLC) (over Uu), and/or packet data convergence protocol (PDCP) (over Uu) header. In one aspect, the UE is sending V2X messages to the network using the Uu interface and the RAN node decides to forward these messages in the cell (and/or to other RAN nodes). In an alternative aspect, the UE is sending V2V messages over the D2D channel (sidelink channels or another channel that could be defined for V2V over PC5 interface) and the eNB listens to that channel and receives that message as well.

In one aspect, the IP address of the destination of the message can be used by the eNB/RSU to decide if a message is to be broadcast in the cell or sent to the ProSe/V2X Function in the Core Network. The eNB/RSU can analyze the type of message. If the V2X message is a V2X safety message then the V2X safety message can be sent to all users within the Cell, or to a group of relevant UEs, which can be decided based on the location of the UEs, a subscription and/or other context information. It should be noted that some specific functionality can be added inside the eNB that enables the eNB to identify if a V2X message is to be sent to the ProSe function in the core network or if V2X messages are to be broadcast immediately in the cell. In one aspect, the UE can add V2X information into the header of the MAC, the PDCP, and/or the RLC header.

In one aspect, a MAC header for the Sidelink Channel (SL_SCH) can have a reserved bit. One of the reserved bits can be used to indicate if the V2X message is to be sent to the ProSe Function or if the V2X message should be immediately broadcast in the cell. When the MAC in the eNB/RSU receives the packet, the eNB reads the MAC header bit. If, for example, the bit is set to 1, the eNB/RSU can place the V2X message in a transmit queue in the MAC layer.

In one aspect, a PDCP header for long PDCP SN (12 bits) packets can contain reserved bits. One of these reserved bits can be used to indicate if the V2X message is to be sent to the ProSe Function or if the V2X message should be immediately broadcast in the cell. When the PDCP in the eNB/RSU receives the V2X message, the eNB reads the header bit. If, for example, the bit is set to 1, the eNB/RSU can place the V2X message in a transmit queue in the PDCP layer.

A PDCP header for short PDCP SN (7 bits) packets does not contain reserved bits. In this case, a new field can be added to represent the V2X message information, and/or the UE can use the long SN header for such transmissions. In another aspect, similar changes, as described form the MAC header and the PDCP header can be made in the RLC header.

In one aspect, a safety messages, such as DSRC BSM, do not have a destination address since the safety messages are primarily intended for nearby users. Thus, in one aspect, a destination address can be added to a V2X safety messages and sent by the UE using IP transport protocol. In this case, a specific, pre-defined IP address can be used for the eNB to determine and identify if the V2X message (e.g., an IP packet) is to be sent over the air interface or towards the ProSe/V2X function in the core network. To avoid deep packet inspection, data packet filters can be implemented in the eNB. The packet filters can be used to map the IP address into an evolved Packet Service (EPS) bearer or back into the cell in broadcast fashion.

Figure 4:
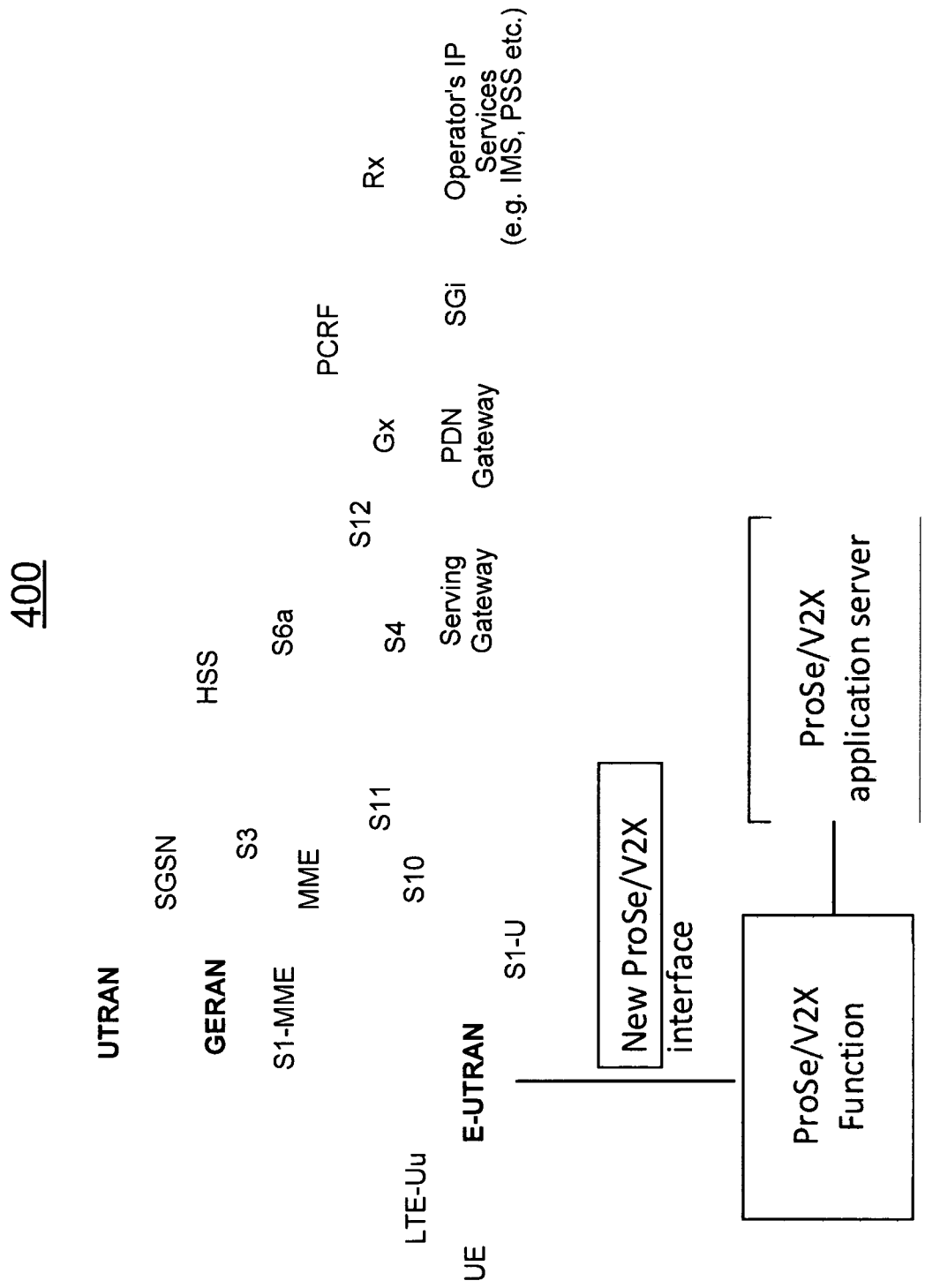
FIG. 4 illustrates a second example V2X communication between a user equipment (UE) and a V2X function within a wireless communication network in accordance with an example.

In one aspect, in order to reduce latency in the V2X message transmission, the V2X interface can be defined directly towards the eNB/E-UTRAN so that eNB can send the packets directly to the ProSe/V2X Function, as illustrated, for example, in FIG. 4. As such, FIG. 4 illustrates a second example V2X communication between a user equipment (UE) and a V2X function using a V2X interface within a wireless communication network in accordance with an example. In one aspect, all data packets can be sent to the ProSe/V2X function, which can decide whether to forward the packets to the ProSe application server or send it back to the cell. This can be done by 1) a header is added by the UE to the data packet (e.g., V2X message) to enable the eNB to identify if the RAN node should forward the V2X message over the air or send the V2X message to the S1-U, 2) add an IP address by the ProSe/V2X function to enable the RAN node to identify if the V2X message is to be sent to the S1-U (IP address of the ProSe/V2X application server) or broadcast in the cell (e.g., a pre-defined address for the cell broadcast), and 3) send the V2X message to a multimedia broadcast multicast service (MBMS) using an interface between ProSe/V2X and the MBMS server.

In order to forward the V2X message to the ProSe/V2X application server, the ProSe/V2X function can add the IP address of the ProSe/V2X application server and send the V2X message to the eNB/RSU. The eNB can forward the V2X message over an IP tunnel in the S1 U interface to the selected P-GW. It should be noted this can be done for V2X message over Uu (V2I messages) or over PC5 (V2V messages).

Figure 5:
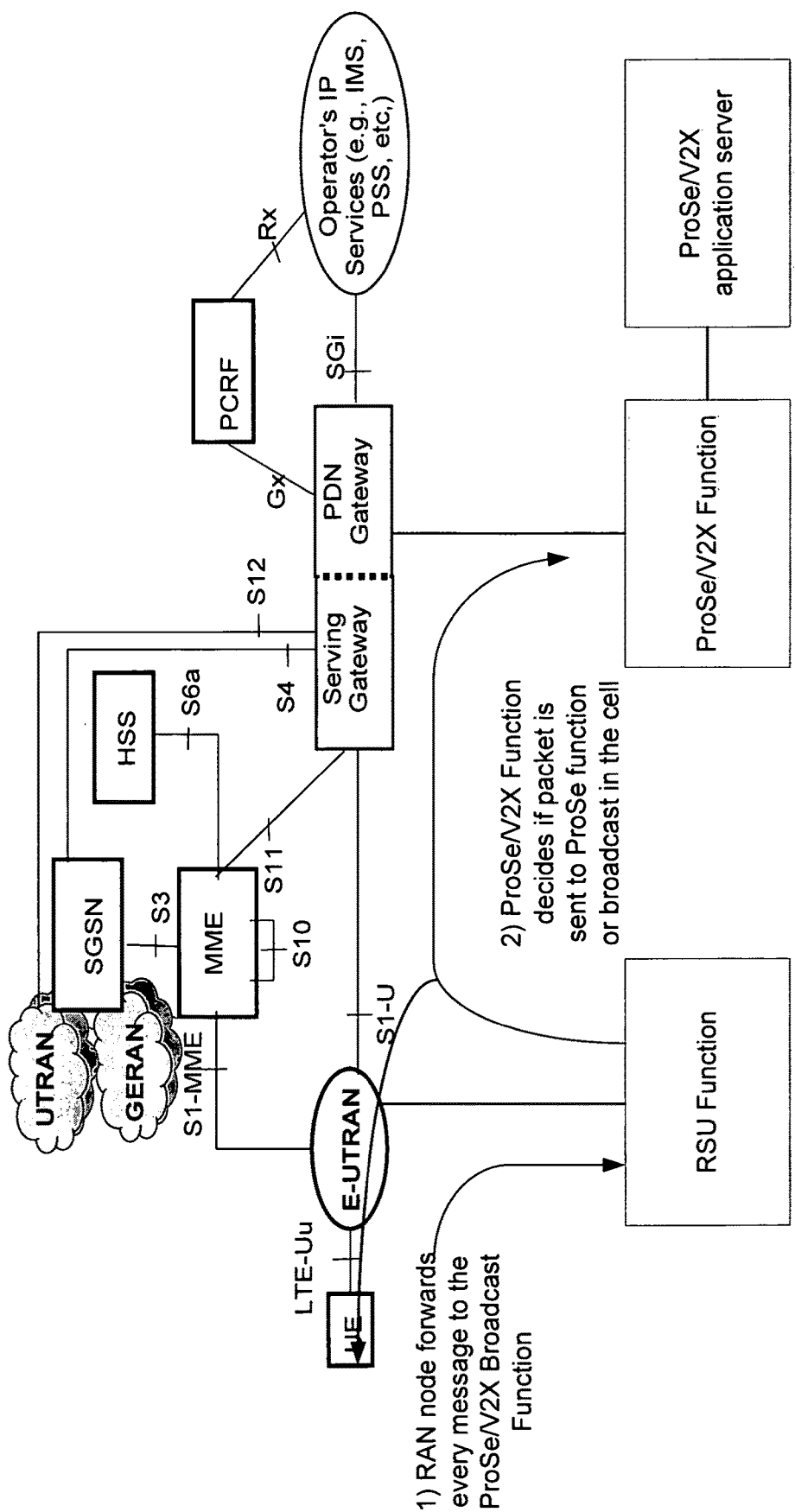
FIG. 5 illustrates a third example V2X communication between a user equipment (UE) and a V2X function within a wireless communication network in accordance with an example.

FIG. 5 illustrates a third example V2X communication between a user equipment (UE) and a V2X function within a wireless communication network.

In one aspect, that RAN node forwards each V2X message, received from the UE, to the RSU function. The RSU function can decide if the V2X message is to be sent to the ProSe/V2X function or broadcasted to the Cell. That is, in one aspect, the ProSe/V2X function can remain in a Core Network and can only be accessed via the user plane. However, a sub-set of ProSe functions (e.g., RSU functionality) can be implemented within and/or next to the eNB/RSU. By including the sub-set of ProSe functions at or near the eNB, it assists in avoiding the obligation to communicate with the ProSe/V2X function in certain cases. In one aspect, every packet, received from the UE, in the eNB can be sent to the RSU function, which is next to the eNB (and/or be included in the eNB). The RSU function can decide if the data packets should be broadcast or the data packets are to be forwarded to the ProSe/V2X function via the user plane. The RSU function acts as a filter deciding the direction of the packet. It should be noted that a broadcast can be over Uu (V2I messages) or over PC5 (V2V messages).

Figure 6:
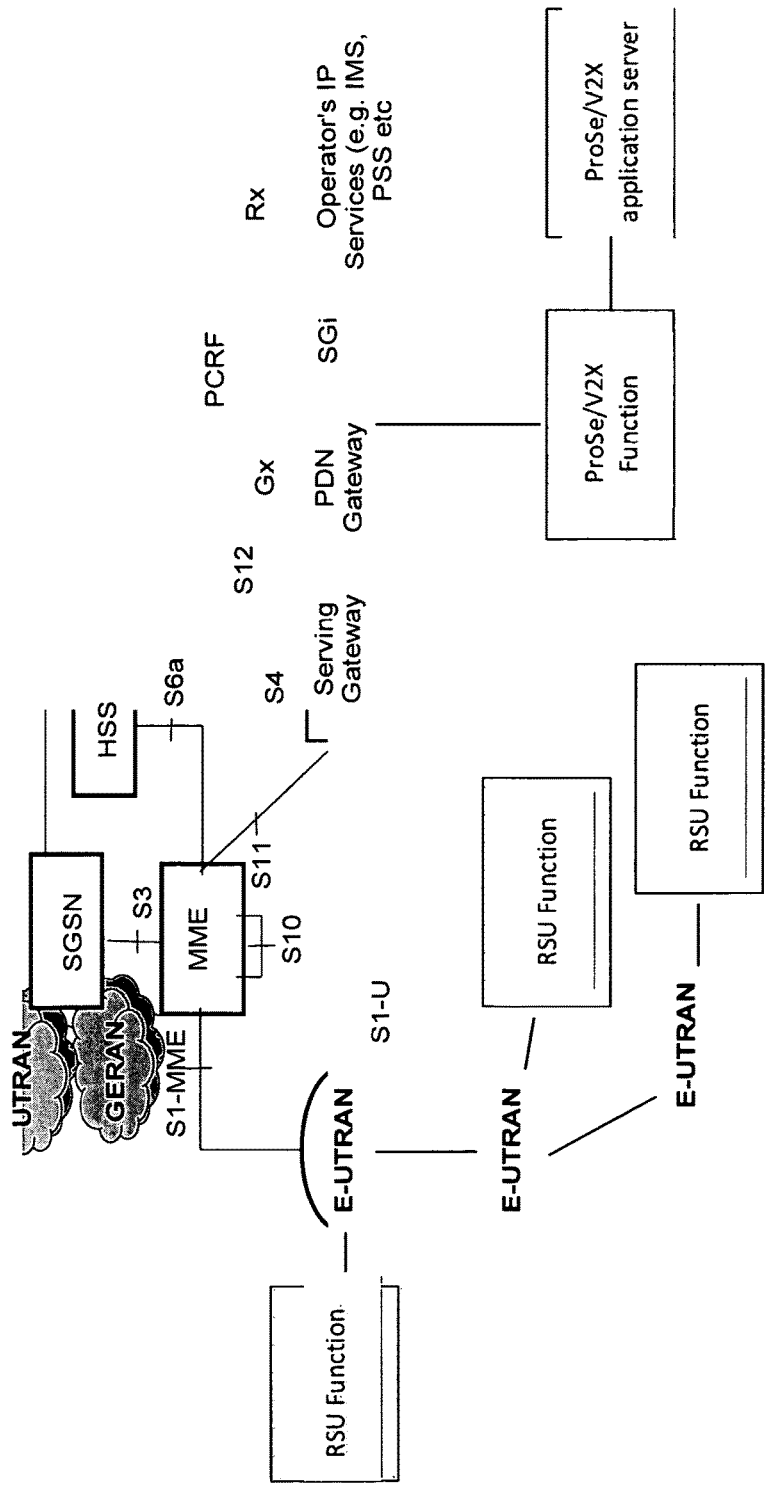
FIG. 6 illustrates a fourth example V2X communication between a user equipment (UE) and a V2X function within a wireless communication network in accordance with an example.
Figure 7:
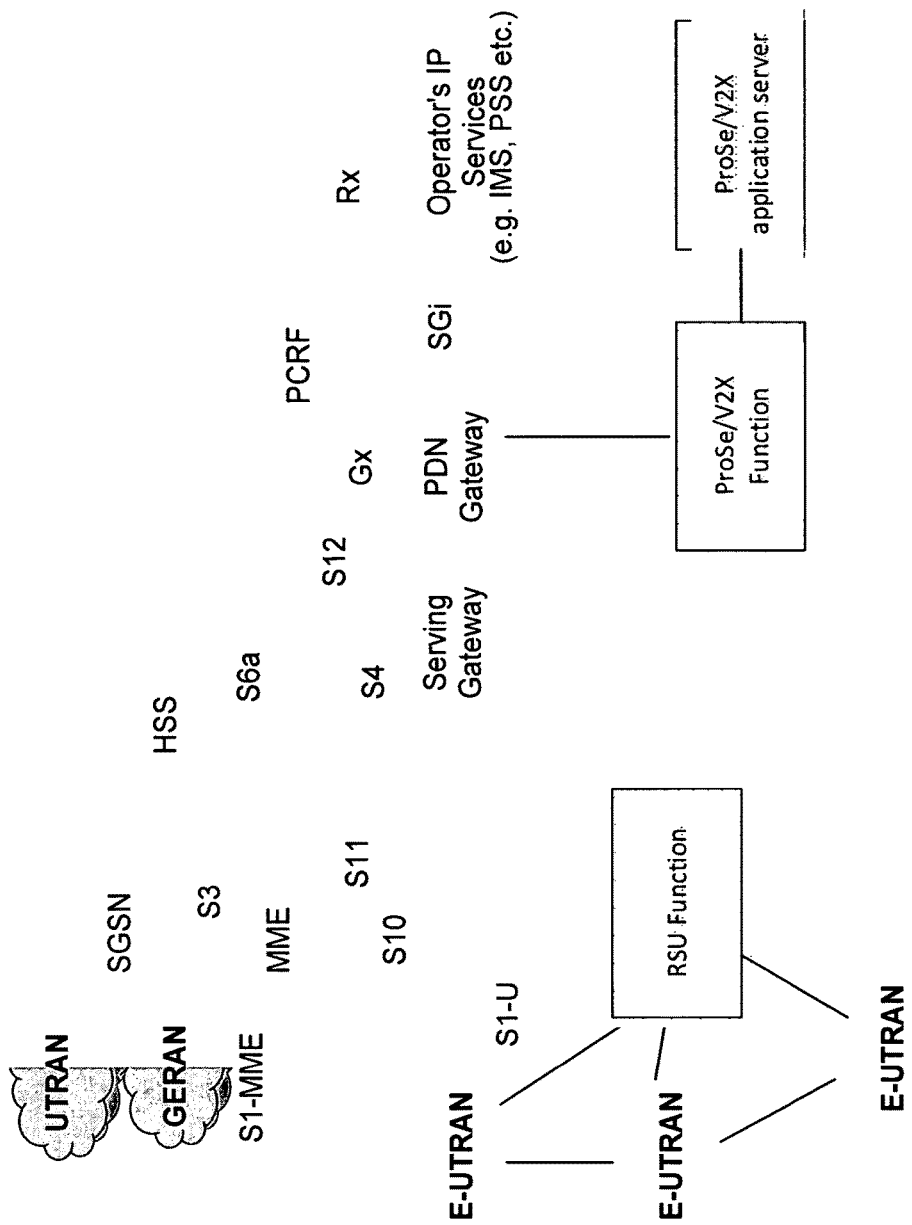
FIG. 7 illustrates a fifth example V2X communication between a user equipment (UE) and a V2X function within a wireless communication network in accordance with an example.

FIGS. 6 and 7 illustrates a fourth and fifth example V2X communication between a user equipment (UE) and a V2X function within a wireless communication network. In one aspect, one or more RSU functions can be created for each eNB. For example, for every ProSe/V2X function, one RSU function can be created for each RAN node (e.g., eNB). One RSU function for every ProSe/V2X function means there is a one-to-many relationship between the ProSe/V2X function and the RSU function. It should be noted that the one or more RSU functions can be next to each one of the eNBs and/or the one or more RSU functions can be implemented as part of each one of the eNBs. In an additional aspect, a single RSU function can be created and shared by multiple eNBs. That is, multiple RAN nodes (eNBs) can share the same RSU function based on the location of multiple RAN nodes, such as, a group of RAN nodes can be created. The group of RAN nodes can share the same RSU Function.

Figure 8:
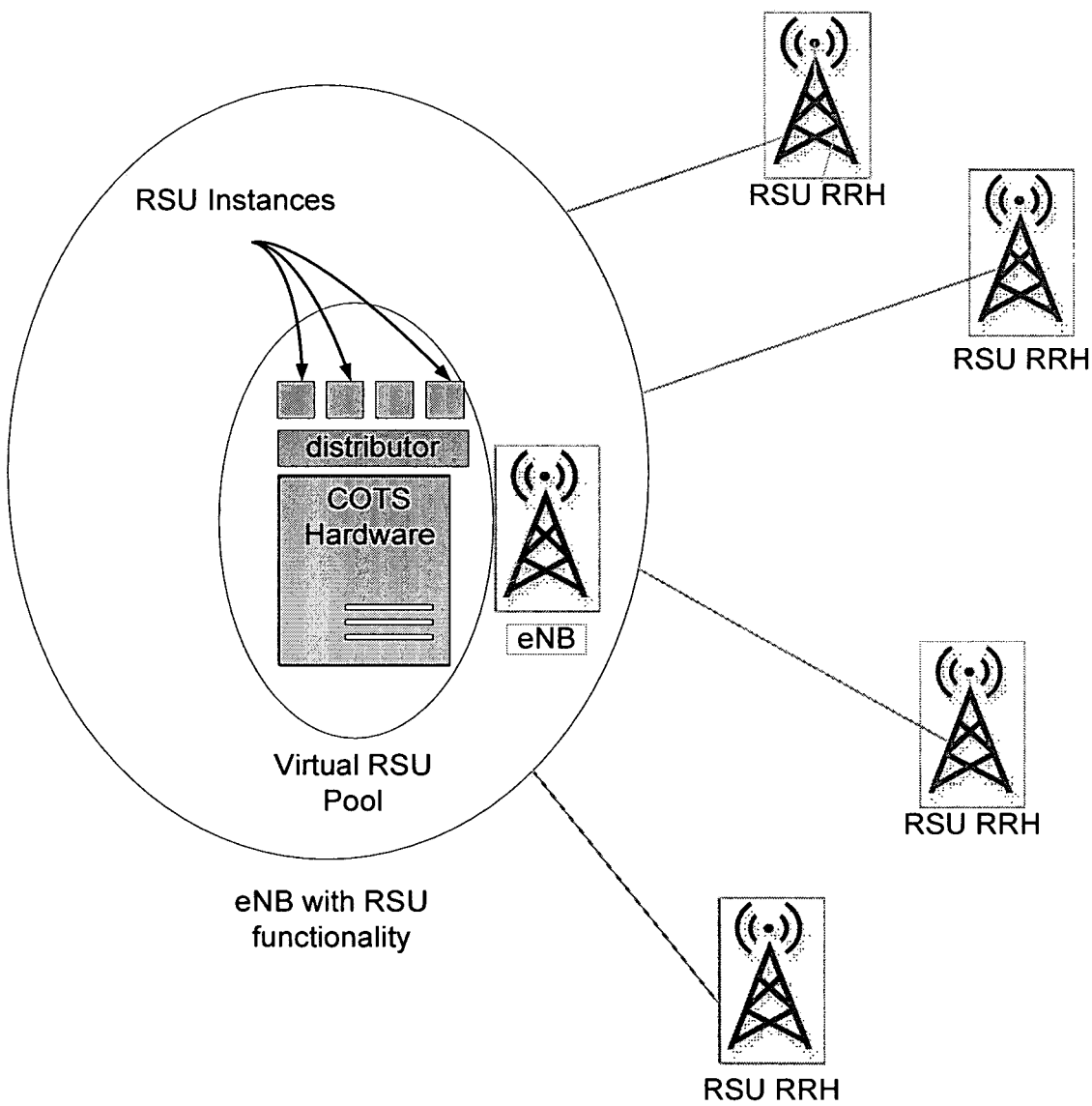
FIG. 8 illustrates a sixth example V2X communication between a user equipment (UE) and a V2X function within a virtual network in accordance with an example.

FIG. 8 illustrates a sixth example V2X communication between a user equipment (UE) and a V2X function within a virtual network. In one embodiment, the RSU functionality can be supported in the eNB. That is, multiple RSU network functions can be instantiated (e.g., a virtualized infrastructure) over a commercial off the shelf (COTS) hardware infrastructure. One or more RSU instances are able to serve the demands of each RSU remote radio head (RRH) based on a traffic demand at any given point of time. For example, during peak traffic scenarios, to avoid failures due to overload on a single RSU instance, multiple instances of RSU can be spun off (e.g., initialized or created) to support the RSU RRH from which very high traffic (e.g., where traffic is greater than a standard operating network load, such as traffic being greater than a predefined traffic standard for network operation) is received. That is, multiple instances of RSU can be virtually created to support the RSU RRH when data traffic exceeds a predefined threshold. When the traffic drops below the predefined threshold level (e.g., returns to a normal state), the multiple RSU instances can be shut down to avoid underutilization of resources. A virtualized infrastructure pool for RSU function can be used and/or created at the eNB. Thus, the virtualized infrastructure pool for RSU function at the eNB creates increases the computing resource efficiency and utilization, particularly in the case of V2X safety communication constraints due to unpredictable traffic loads.

In one aspect, eNB/RSU can read the V2X message ID which can be located inside each V2X safety message. If the V2X message is a safety message, then it can be sent in the cell to all users and so the eNB/RSU sends the packet over the air instead of forwarding it to the ProSe function. An example of safety message (BSM) pseudo code is shown below for the DSRC protocol. Different protocols will have different message structures.

```
Safety message (BSM) pseudo code

-- MSG_BasicSafetyMessage (BSM) (Desc Name) Record 1
BasicSafetyMessage ::= SEQUENCE {
  -- Part I
  msgID     DSRCmsgID,              -- 1 byte
  -- Sent as a single octet blob
  blob1     BSMblob,
  --
  -- The blob consists of the following 38 packed bytes:
  --
  -- msgCnt   MsgCount,              -x- 1 byte
  -- id       TemporaryID,           -x- 4 bytes
  -- secMark  DSecond,               -x- 2 bytes
  -- pos      PositionLocal3D,
     -- lat    Latitude,             -x- 4 bytes
     -- long   Longitude,            -x- 4 bytes
     -- elev   Elevation,            -x- 2 bytes
     -- accuracy PositionalAccuracy, -x- 4 bytes
  -- motion   Motion,
     -- speed   TransmissionAndSpeed, -x- 2 bytes
     -- heading Heading,             -x- 2 byte
     -- angle   Steering WheelAngle  -x- 1 bytes
     -- accelSet AccelerationSet4Way, -x- 7 bytes
  -- control Control,
  -- brakes  BrakeSystem Status,     -x- 2 bytes
  -- basic   VehicleBasic,
  -- size    VehicleSize,            -x- 3 bytes
  -- Part II, sent as desired
  -- Part II,
  safetyExt VehicleSafetyExtension OPTIONAL,
  status    VehicleStatus        OPTIONAL,
  ... -- # LOCAL_CONTENT
}
```

Figure 9:
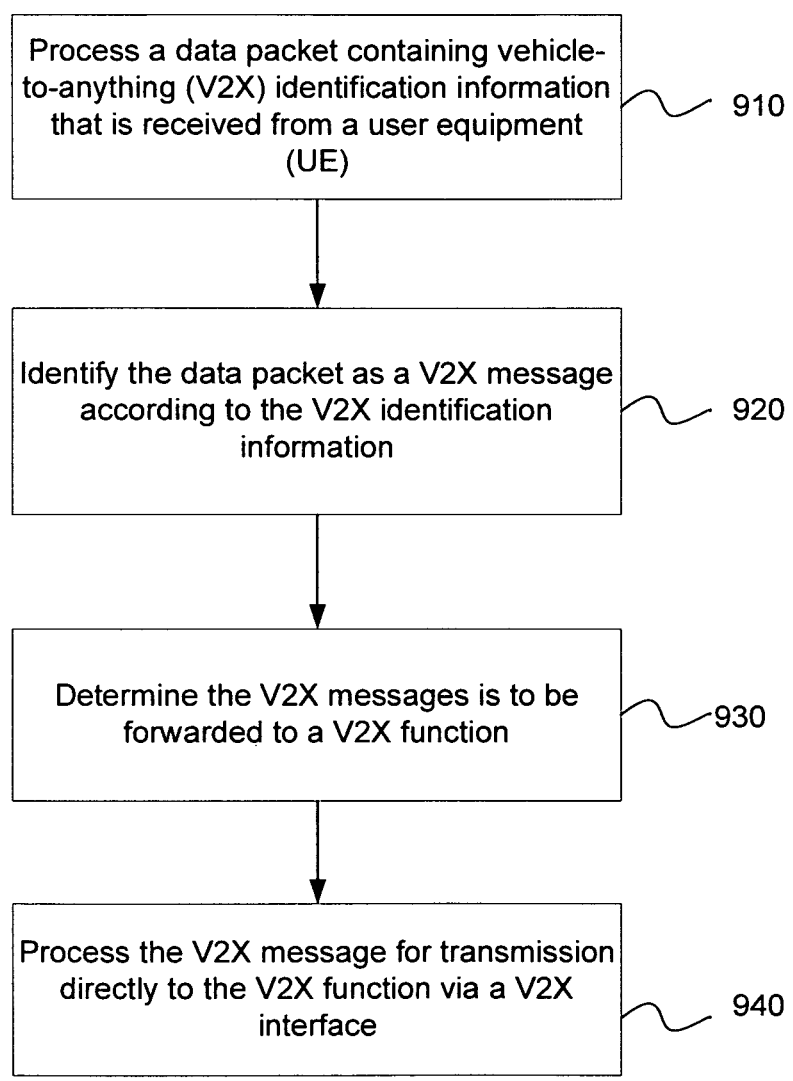
FIG. 9 depicts functionality of an eNodeB operable to perform V2X communication between a user equipment (UE) and a V2X function within a wireless communication network in accordance with an example.

FIG. 9 depicts functionality of eNodeB operable to perform V2X communication between a user equipment (UE) and a V2X function within a wireless communication network. Another example provides functionality 900 of a eNodeB operable to perform V2X communication between a user equipment (UE) and a V2X function, as shown in the flow chart in FIG. 9. The functionality can be implemented as a method or the functionality can be executed as instructions on a machine, where the instructions are included on one or more computer readable mediums or non-transitory machine readable storage mediums. The eNodeB can comprise one or more processors and memory configured to: Process a data packet containing vehicle-to-anything (V2X) identification information that is received from a user equipment (UE), as in block 910. The eNodeB can comprise one or more processors and memory configured to: identify the data packet as a V2X message according to the V2X identification information, as in block 920. The eNodeB can comprise one or more processors and memory configured to: determine the V2X messages is to be forwarded to a V2X function, as in block 930. The eNodeB can comprise one or more processors and memory configured to: process the V2X message for transmission directly to the V2X function via a V2X interface, as in block 940.

Figure 10:
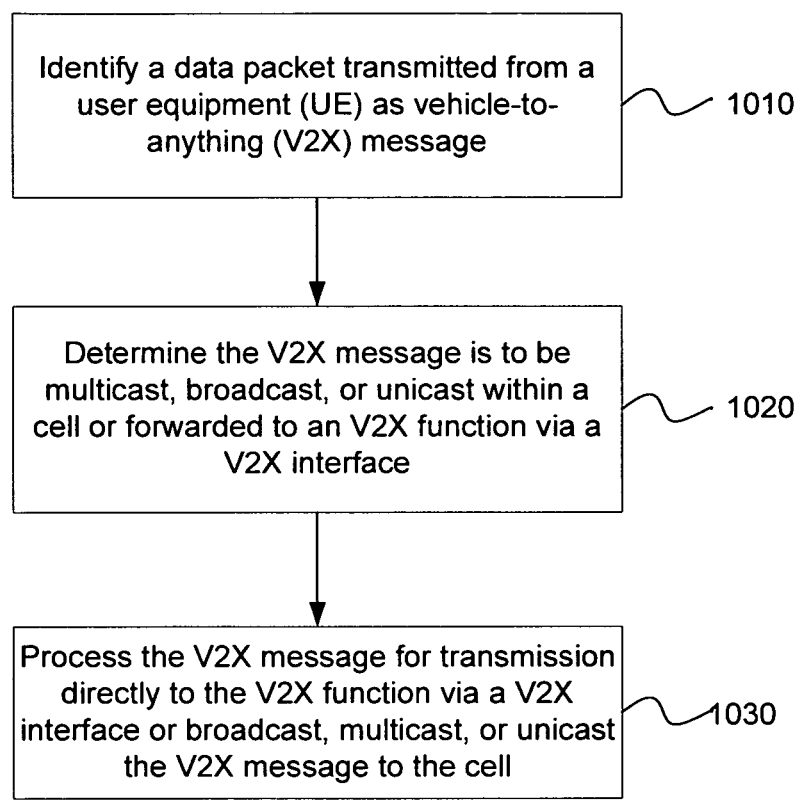
FIG. 10 depicts functionality of a road side assistance unit (RSU) operable to perform V2X communication between a user equipment (UE) and a V2X function within a wireless communication network in accordance with an example.

FIG. 10 depicts functionality of a road side assistance unit (RSU) operable to perform V2X communication between a user equipment (UE) and a V2X function within a wireless communication network. The functionality 1000 can be implemented as a method or the functionality can be executed as instructions on a machine, where the instructions are included on one or more computer readable mediums or non-transitory machine readable storage mediums. The RSU can comprise one or more processors and memory configured to: identify a data packet transmitted from a user equipment (UE) as a V2X message, as in block 1010. The RSU can determine the V2X message is to be multicast, unicast, or broadcast within a cell or forwarded to a V2X function via a V2X interface, as in block 1020. The RSU can process the V2X message for transmission directly to the V2X function via a V2X interface or multicast, unicast, or broadcast the V2X message to the cell, as in block 1030.

Figure 11:
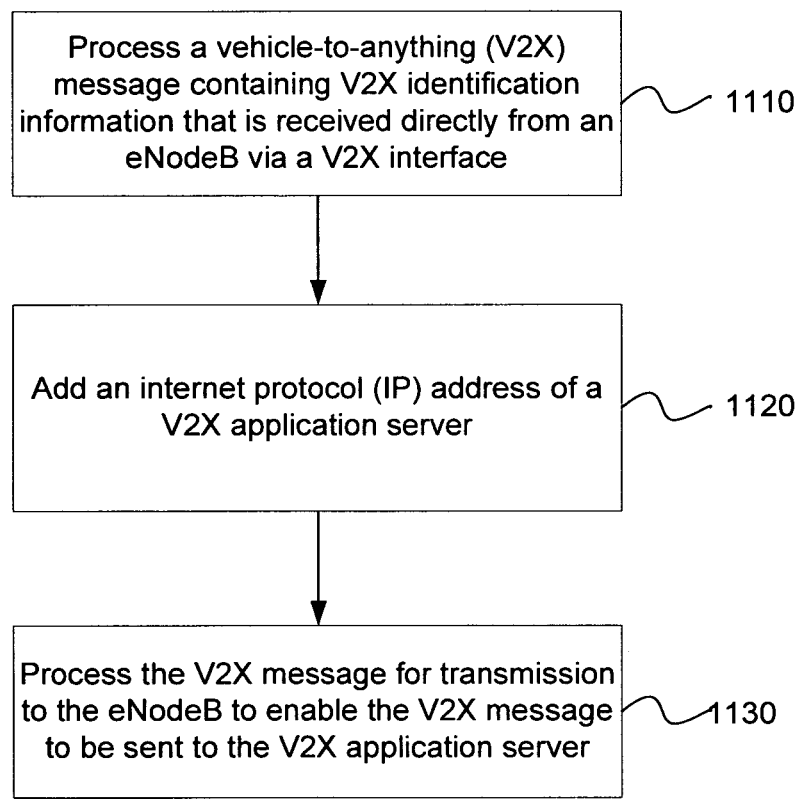
FIG. 11 depicts functionality of a V2X function operable to perform V2X communication between a user equipment (UE) and a V2X function within a wireless communication network in accordance with an example.

FIG. 11 depicts functionality of V2X function operable to perform V2X communication with a user equipment (UE) and the V2X function within a wireless communication network. Another example provides functionality 1100 of V2X function operable to perform V2X communication with a user equipment (UE) and the V2X function within a wireless communication network, as shown in the flow chart in FIG. 11. The functionality can be implemented as a method or the functionality can be executed as instructions on a machine, where the instructions are included on at least one computer readable medium or one or more non-transitory machine readable storage mediums. The V2X function can comprise one or more processors and memory configured to: process a vehicle-to-anything (V2X) message containing V2X identification information that is received directly from an eNodeB via a V2X interface, as in block 1110. The V2X function can add an internet protocol (IP) address of a V2X application server, as in block 1120. The V2X function can process the V2X message for transmission to the eNodeB to enable the V2X message to be sent to the V2X application server, as in block 1130.

Figure 12:
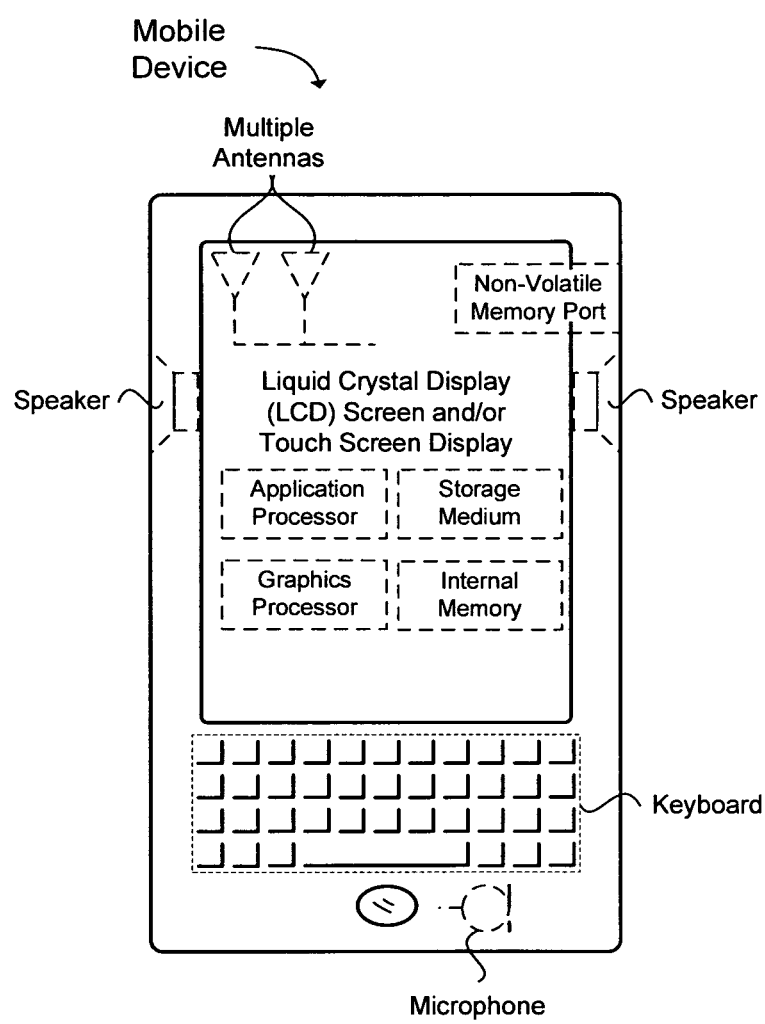
FIG. 12 illustrates a diagram of example components of a wireless device (e.g. User Equipment "UE") device in accordance with an example.

FIG. 12 illustrates a diagram of a wireless device (e.g., UE) in accordance with an example. FIG. 12 provides an example illustration of the wireless device, such as a user equipment (UE), a mobile station (MS), a mobile wireless device, a mobile communication device, a tablet, a handset, or other type of wireless device. In one aspect, the wireless device can include at least one of an antenna, a touch sensitive display screen, a speaker, a microphone, a graphics processor, a baseband processor, an application processor, internal memory, a non-volatile memory port, and combinations thereof.

The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The mobile device can include a storage medium. In one aspect, the storage medium can be associated with and/or communication with the application processor, the graphics processor, the display, the non-volatile memory port, and/or internal memory. In one aspect, the application processor and graphics processor are storage mediums.

Figure 13:
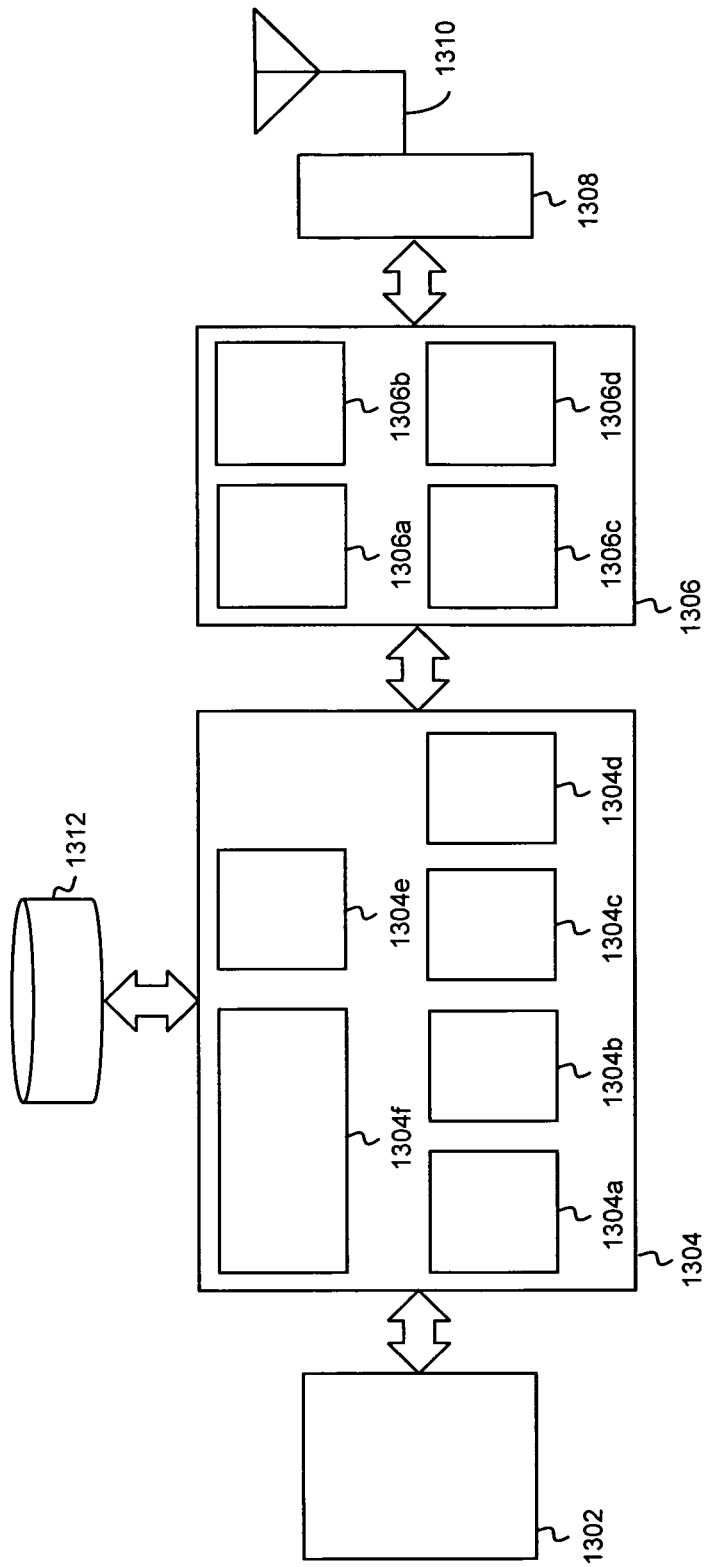
FIG. 13 illustrates a diagram of example components of a User Equipment (UE) device in accordance with an example.

FIG. 13 illustrates a diagram of example components of a User Equipment (UE) device in accordance with an example. FIG. 13 illustrates, for one aspect, example components of a User Equipment (UE) device 1300. In some aspects, the UE device 1300 can include application circuitry 1302, baseband circuitry 1304, Radio Frequency (RF) circuitry 1306, front-end module (FEM) circuitry 1308 and one or more antennas 1310, coupled together at least as shown.

The application circuitry 1302 can include one or more application processors. For example, the application circuitry 1302 can include circuitry such as, but not limited to, one or more single-core or multi-core processors. The processor(s) can include any combination of general-purpose processors and dedicated processors (e.g., graphics processors, application processors, etc.). The processors can be coupled with and/or can include memory/storage and can be configured to execute instructions stored in the memory/storage to enable various applications and/or operating systems to run on the system.

The baseband circuitry 1304 can include circuitry such as, but not limited to, one or more single-core or multi-core processors. The baseband circuitry 1304 can include one or more baseband processors and/or control logic to process baseband signals received from a receive signal path of the RF circuitry 1306 and to generate baseband signals for a transmit signal path of the RF circuitry 1306. Baseband processing circuitry 1304 can interface with the application circuitry 1302 for generation and processing of the baseband signals and for controlling operations of the RF circuitry 1306. For example, in some aspects, the baseband circuitry 1304 can include a second generation (2G) baseband processor 1304a, third generation (3G) baseband processor 1304b, fourth generation (4G) baseband processor 1304c, and/or other baseband processor(s) 1304d for other existing generations, generations in development or to be developed in the future (e.g., fifth generation (5G), 6G, etc.). The baseband circuitry 1304 (e.g., one or more of baseband processors 1304a-d) can handle various radio control functions that enable communication with one or more radio networks via the RF circuitry 1306. The radio control functions can include, but are not limited to, signal modulation/demodulation, encoding/decoding, radio frequency shifting, etc. In some aspects, modulation/demodulation circuitry of the baseband circuitry 1304 can include Fast-Fourier Transform (FFT), precoding, and/or constellation mapping/demapping functionality. In some aspects, encoding/decoding circuitry of the baseband circuitry 1304 can include convolution, tail-biting convolution, turbo, Viterbi, and/or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 1304 can include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1304e of the baseband circuitry 1304 can be configured to run elements of the protocol stack for signaling of the PHY, MAC, RLC, PDCP and/or RRC layers. In some aspects, the baseband circuitry can include one or more audio digital signal processor(s) (DSP) 1304*f*. The audio DSP(s) 1304*f* can be include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 1304 and the application circuitry 1302 can be implemented together such as, for example, on a system on a chip (SOC).

In some aspects, the baseband circuitry 1304 can provide for communication compatible with one or more radio technologies. For example, in some aspects, the baseband circuitry 1304 can support communication with an evolved universal terrestrial radio access network (EUTRAN) and/or other wireless metropolitan area networks (WMAN), a wireless local area network (WLAN), a wireless personal area network (WPAN). Aspects in which the baseband circuitry 1304 is configured to support radio communications of more than one wireless protocol can be referred to as multi-mode baseband circuitry.

RF circuitry 1306 can enable communication with wireless networks using modulated electromagnetic radiation through a non-solid medium. In various aspects, the RF circuitry 1306 can include switches, filters, amplifiers, etc. to facilitate the communication with the wireless network. RF circuitry 1306 can include a receive signal path which can include circuitry to down-convert RF signals received from the FEM circuitry 1308 and provide baseband signals to the baseband circuitry 1304. RF circuitry 1306 can also include a transmit signal path which can include circuitry to up-convert baseband signals provided by the baseband circuitry 1304 and provide RF output signals to the FEM circuitry 1308 for transmission.

In some aspects, the RF circuitry 1306 can include a receive signal path and a transmit signal path. The receive signal path of the RF circuitry 1306 can include mixer circuitry 1306*a*, amplifier circuitry 1306*b* and filter circuitry 1306*c*. The transmit signal path of the RF circuitry 1306 can include filter circuitry 1306*c* and mixer circuitry 1306*a*. RF circuitry 1306 can also include synthesizer circuitry 1306*d* for synthesizing a frequency for use by the mixer circuitry 1306*a* of the receive signal path and the transmit signal path. In some aspects, the mixer circuitry 1306*a* of the receive signal path can be configured to down-convert RF signals received from the FEM circuitry 1308 based on the synthesized frequency provided by synthesizer circuitry 1306*d*. The amplifier circuitry 1306*b* can be configured to amplify the down-converted signals and the filter circuitry 1306*c* can be a low-pass filter (LPF) or band-pass filter (BPF) configured to remove unwanted signals from the down-converted signals to generate output baseband signals. Output baseband signals can be provided to the baseband circuitry 1304 for further processing. In some aspects, the output baseband signals can be zero-frequency baseband signals, although this is not a constraint. In some aspects, mixer circuitry 1306*a* of the receive signal path can comprise passive mixers, although the scope of the aspects is not limited in this respect.

In some aspects, the mixer circuitry 1306*a* of the transmit signal path can be configured to up-convert input baseband signals based on the synthesized frequency provided by the synthesizer circuitry 1306*d* to generate RF output signals for the FEM circuitry 1308. The baseband signals can be provided by the baseband circuitry 1304 and can be filtered by filter circuitry 1306*c*. The filter circuitry 1306*c* can include a low-pass filter (LPF), although the scope of the aspects is not limited in this respect.

In some aspects, the mixer circuitry 1306*a* of the receive signal path and the mixer circuitry 1306*a* of the transmit signal path can include two or more mixers and can be arranged for quadrature downconversion and/or upconversion respectively. In some aspects, the mixer circuitry 1306*a* of the receive signal path and the mixer circuitry 1306*a* of the transmit signal path can include two or more mixers and can be arranged for image rejection (e.g., Hartley image rejection). In some aspects, the mixer circuitry 1306*a* of the receive signal path and the mixer circuitry 1306*a* can be arranged for direct downconversion and/or direct upconversion, respectively. In some aspects, the mixer circuitry 1306*a* of the receive signal path and the mixer circuitry 1306*a* of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 1306 can include analog-to-digital converter (ADC) and digital-to-analog converter (DAC) circuitry and the baseband circuitry 1304 can include a digital baseband interface to communicate with the RF circuitry 1306.

In some dual-mode embodiments, a separate radio IC circuitry can be provided for processing signals for each spectrum, although the scope of the embodiments is not limited in this respect.

In some embodiments, the synthesizer circuitry 1306*d* can be a fractional-N synthesizer or a fractional N/N+1 synthesizer, although the scope of the embodiments is not limited in this respect as other types of frequency synthesizers can be suitable. For example, synthesizer circuitry 1306*d* can be a delta-sigma synthesizer, a frequency multiplier, or a synthesizer comprising a phase-locked loop with a frequency divider.

The synthesizer circuitry 1306*d* can be configured to synthesize an output frequency for use by the mixer circuitry 1306*a* of the RF circuitry 1306 based on a frequency input and a divider control input. In some embodiments, the synthesizer circuitry 1306*d* can be a fractional N/N+1 synthesizer.

In some embodiments, frequency input can be provided by a voltage controlled oscillator (VCO), although that is not a constraint. Divider control input can be provided by either the baseband circuitry 1304 or the applications processor 1302 depending on the desired output frequency. In some embodiments, a divider control input (e.g., N) can be determined from a look-up table based on a channel indicated by the applications processor 1302.

Synthesizer circuitry 1306*d* of the RF circuitry 1306 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1306*d* can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 1306 can include an IQ/polar converter.

FEM circuitry 1308 can include a receive signal path which can include circuitry configured to operate on RF signals received from one or more antennas 1310, amplify the received signals and provide the amplified versions of the received signals to the RF circuitry 1306 for further processing. FEM circuitry 1308 can also include a transmit signal path which can include circuitry configured to amplify signals for transmission provided by the RF circuitry 1306 for transmission by one or more of the one or more antennas 1310.

In some embodiments, the FEM circuitry 1308 can include a TX/RX switch to switch between transmit mode and receive mode operation. The FEM circuitry can include a receive signal path and a transmit signal path. The receive signal path of the FEM circuitry can include a low-noise amplifier (LNA) to amplify received RF signals and provide the amplified received RF signals as an output (e.g., to the RF circuitry 1306). The transmit signal path of the FEM circuitry 1308 can include a power amplifier (PA) to amplify input RF signals (e.g., provided by RF circuitry 1306), and one or more filters to generate RF signals for subsequent transmission (e.g., by one or more of the one or more antennas 1310.

In some embodiments, the UE device 1300 can include additional elements such as, for example, memory/storage, display, camera, sensor, and/or input/output (I/O) interface.

Figure 14:
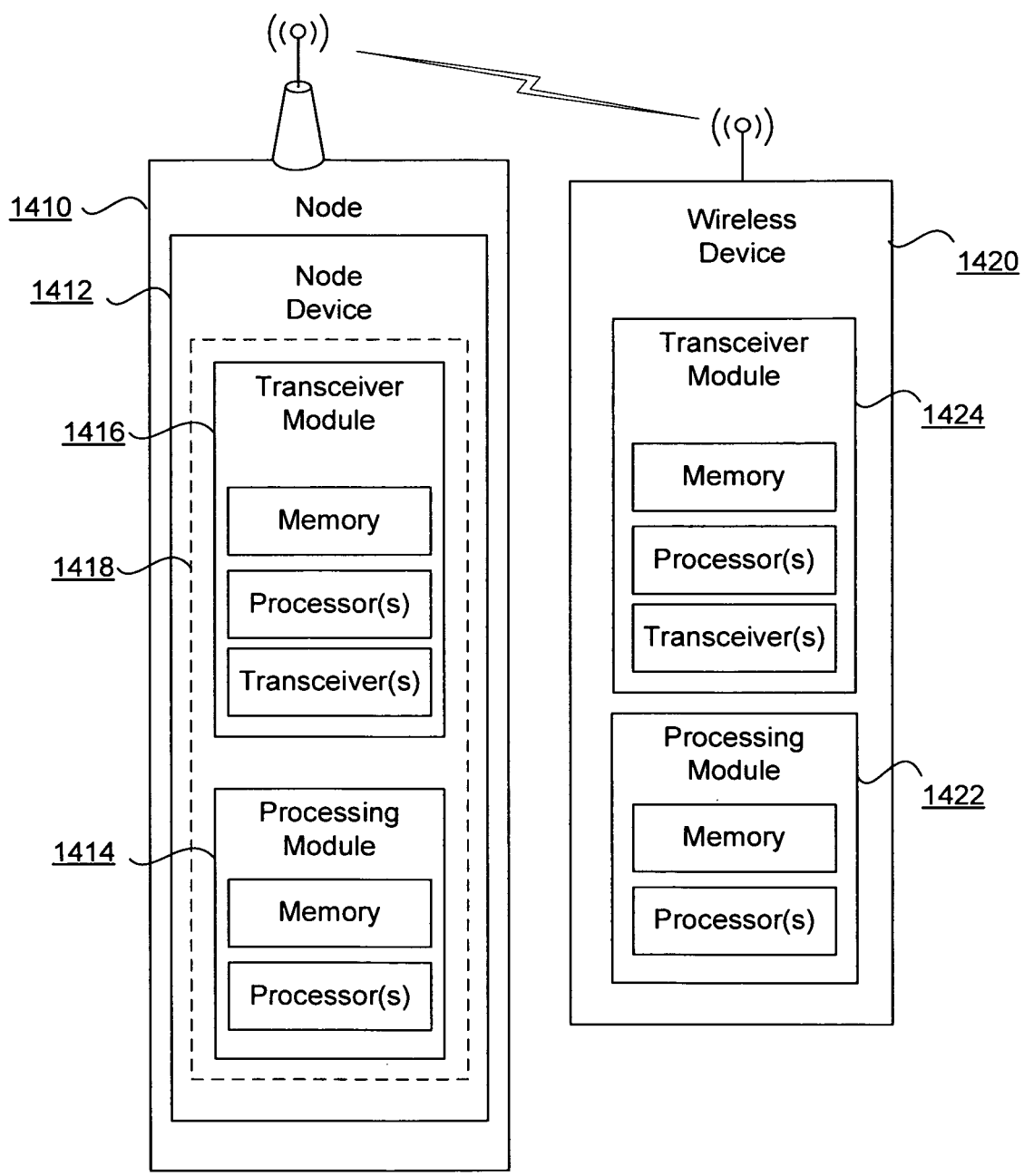
FIG. 14 illustrates a diagram of a node (e.g., eNB) and wireless device (e.g., UE) in accordance with an example.

FIG. 14 illustrates a diagram 1400 of a node 1410 (e.g., eNB and/or a Serving GPRS Support Node) and wireless device (e.g., UE) in accordance with an example. The node can include a base station (BS), a Node B (NB), an evolved Node B (eNB), a baseband unit (BBU), a remote radio head (RRH), a remote radio equipment (RRE), a remote radio unit (RRU), or a central processing module (CPM). In one aspect, the node can be a Serving GPRS Support Node. The node 1410 can include a node device 1412. The node device 1412 or the node 1410 can be configured to communicate with the wireless device 1420. The node device 1412 can be configured to implement the technology described. The node device 1412 can include a processing module 1414 and a transceiver module 1416. In one aspect, the node device 1412 can include the transceiver module 1416 and the processing module 1414 forming a circuitry 1418 for the node 1410. In one aspect, the transceiver module 1416 and the processing module 1414 can form a circuitry of the node device 1412. The processing module 1414 can include one or more processors and memory. In one embodiment, the processing module 1422 can include one or more application processors. The transceiver module 1416 can include a transceiver and one or more processors and memory. In one embodiment, the transceiver module 1416 can include a baseband processor.

The wireless device 1420 can include a transceiver module 1424 and a processing module 1422. The processing module 1422 can include one or more processors and memory. In one embodiment, the processing module 1422 can include one or more application processors. The transceiver module 1424 can include a transceiver and one or more processors and memory. In one embodiment, the transceiver module 1424 can include a baseband processor. The wireless device 1420 can be configured to implement the technology described. The node 1410 and the wireless devices 1420 can also include one or more storage mediums, such as the transceiver module 1416, 1424 and/or the processing module 1414, 1422.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

EXAMPLES

The following examples pertain to specific technology embodiments and point out specific features, elements, or steps that can be used or otherwise combined in achieving such embodiments.

Example 1 includes an apparatus of an eNodeB operable to support vehicle-to-anything (V2X) communication within a wireless communication network, the apparatus comprising one or more processors and memory configured to: process a data packet containing V2X identification information received from an user equipment (UE); identify the data packet as a V2X message according to the V2X identification information; determine the V2X messages are to be forwarded to a V2X function; and process the V2X message for transmission directly to the V2X function via a V2X interface.

Example 2 includes the apparatus of example 1, further configured to process the data packet received from the UE over a device-to-device (D2D) channel and/or or received over a cellular interface (e.g., a LTE U).

Example 3 includes the apparatus of example 1 or 2, wherein the eNodeB is a road-side unit (RSU).

Example 4 includes the apparatus of example 1, wherein the eNodeB shares a road-side unit (RSU) with at least one alternative eNodeB.

Example 5 includes the apparatus of example 1 or 4, further configured to process, for forwarding, the V2X message to a road-side unit (RSU) in communication with the V2X function and the eNodeB.

Example 6 includes the apparatus of example 1, further configured to determine the V2X message is to be forwarded to the function or broadcasted within a Cell according to an internet protocol (IP) address of the V2X message, and/or multicast or unicast within a cell, and/or the eNB can send the V2X message to identified vehicles according to a location of a source of the V2X message and targeted vehicles.

Example 7 includes the apparatus of example 1 or 6, further configured to process the V2X message received from the V2X function, having an internet protocol (IP) address of an application server.

Example 8 includes the apparatus of example 1, further configured to forward the V2X message via the V2X interface to the V2X function to enable the V2X function to add an internet protocol (IP) address of an application server.

Example 9 includes the apparatus of example 8, further configured to process the V2X message received from the V2X function via the V2X interface having the IP address of the application server.

Example 10 includes the apparatus of example 1 or 9, further configured to process, for forwarding, the V2X message, having the IP address of the application server over an IP tunnel to a selected packet data network (PDN) gateway.

Example 11 includes the apparatus of example 1, further configured to: determine the V2X message is a V2X safety message according to the V2X identification information; broadcast the safety V2X message to a cell; unicast the safety V2X message to a cell; or multicast the safety V2X message to a cell.

Example 12 includes the apparatus of example 1 or 11, further configured to use a packet filter to map an internet protocol (IP) address to either an evolved Packet Service (EPS) bearer or into to a cell.

Example 13 includes the apparatus of example 1, wherein the V2X identification information is included in a MAC header, in a RLC header, or in a packet data convergence protocol (PDCP) header.

Example 14 includes the apparatus of example 1 or 13, wherein the vehicle-to-anything (V2X) communication is a vehicle-to-vehicle communication, vehicle-to-person communication, or vehicle-to-network communication.

Example 15 includes the apparatus of example 1, wherein the apparatus includes at least one of an antenna, a touch sensitive display screen, a speaker, a microphone, a graphics processor, an application processor, a baseband processor, an internal memory, a non-volatile memory port, and combinations thereof.

Example 16 includes an apparatus of a road-side unit (RSU) to support vehicle-to-anything (V2X) communication within a wireless communication network, the apparatus comprising one or more processors and memory configured to: identify a data packet transmitted from a user equipment (UE) as a V2X message; determine the V2X message is to be broadcast within a cell or forwarded to an V2X function via a V2X interface; and process the V2X message for transmission directly to the V2X function via a V2X interface or multicast, unicast, or broadcast the V2X message to the cell.

Example 17 includes the apparatus of example 16, further configured to identify an internet protocol (IP) address of a destination of the V2X message.

Example 18 includes the apparatus of example 16 or 17, further configured to determine the V2X message is a V2X safety message.

Example 19 includes the apparatus of example 18, further configured to: identify the V2X identification information is stored within the V2X message; determine the V2X message is the V2X safety message according to the V2X identification information within the V2X message; and broadcast the safety V2X message to a cell; unicast the safety V2X message to a cell; or multicast the safety V2X message to a cell.

Example 20 includes the apparatus of example 16 or 19, further configured to read the V2X identification information.

Example 21 includes the apparatus of example 16, where the RSU is an eNodeB, the RSU is shared between a plurality of eNodeBs, or the RSU is a virtual computing instance of a plurality of virtual RSU pools shared between one or more eNodeBs.

Example 22 includes the apparatus of example 16 or 21, wherein the RSU has a one-to many relationship with the V2X function.

Example 23 includes the apparatus of example 16, further configured to process, for forwarding, the V2X message to a road-side unit (RSU) in communication with the V2X function and the eNodeB.

Example 24 includes the apparatus of example 16, further configured to determine the V2X message is to be forwarded to the function or broadcasted within a Cell according to an internet protocol (IP) address of the V2X message.

Example 25 includes the apparatus of example 16 or 24, further configured: process the V2X message received from the V2X function, having an internet protocol (IP) address of an application server; process, for forwarding, the V2X message via the V2X interface to the V2X function to enable the V2X function to add an internet protocol (IP) address of an application server; or process the V2X message received from the V2X function via the V2X interface having the IP address of the application server.

Example 26 includes the apparatus of example 16, further configured to process, for forwarding, the V2X message, having the IP address of the application server over an IP tunnel to a selected packet data network (PDN) gateway.

Example 27 includes the apparatus of example 16 or 26, wherein the V2X identification information is included in a MAC header, in a RLC header, or in a packet data convergence protocol (PDCP) header.

Example 28 includes a vehicle-to-anything (V2X) function within a wireless communication network, the V2X function comprising one or more processors and memory configured to: process a V2X message containing V2X identification information received directly from an eNodeB via a V2X interface; add an internet protocol (IP) address of a V2X application server; and process the V2X message for transmission to the eNodeB to enable the V2X message to be sent to the V2X application server.

Example 29 includes the V2X function of example 28, wherein the one or more processors and memory further configured to determine the V2X message is a V2X safety message.

Example 30 includes the at least one machine readable storage medium having instructions embodied thereon for perform vehicle-to-anything (V2X) communication within a wireless communication network, the instructions when executed by one or more processors and memory perform the following: process a data packet containing V2X identification information received from an user equipment (UE); identify the data packet as a V2X message according to the V2X identification information; determine the V2X message is to be multicast, unicast, or broadcast within a cell or forwarded to an V2X function via a V2X interface; and process the V2X message for transmission directly to the V2X function via a V2X interface or perform one of multicast, unicast, or broadcast the V2X message to the cell.

Example 31 includes the least one machine readable storage medium of example 30, further comprising instructions when executed process the data packet received from the UE over a device-to-device (D2D) channel.

Example 32 includes an apparatus of an eNodeB operable to support vehicle-to-anything (V2X) communication within a wireless communication network, the apparatus comprising one or more processors and memory configured to: process a data packet containing V2X identification information received from an user equipment (UE); identify the data packet as a V2X message according to the V2X identification information; determine the V2X messages are to be forwarded to a V2X function; and process the V2X message for transmission directly to the V2X function via a V2X interface or receive the data packets over a cellular interface.

Example 33 includes the apparatus of example 32, further configured to process the data packet received from the UE over a device-to-device (D2D) channel.

Example 34 includes an apparatus of an eNodeB operable to support vehicle-to-anything (V2X) communication within a wireless communication network, the apparatus comprising one or more processors and memory configured to: process a data packet containing V2X identification information received from an user equipment (UE); identify the data packet as a V2X message according to the V2X identification information; determine the V2X messages are to be forwarded to a V2X function; and process the V2X message for transmission directly to the V2X function via a V2X interface or receive the data packets over a cellular interface.

Example 35 includes the apparatus of example 34, further configured to process the data packet received from the UE over a device-to-device (D2D) channel.

Example 36 includes the apparatus of example 34, wherein the eNodeB is a road-side unit (RSU).

Example 37 includes the apparatus of example 34, wherein the eNodeB shares a road-side unit (RSU) with at least one alternative eNodeB.

Example 38 includes the apparatus of example 34, further configured to process, for forwarding, the V2X message to a road-side unit (RSU) in communication with the V2X function and the eNodeB.

Example 39 includes the apparatus of example 34, further configured to determine the V2X message is to be forwarded to the function or broadcasted within a Cell according to an internet protocol (IP) address of the V2X message.

Example 40 includes the apparatus of example 34, further configured to process the V2X message received from the V2X function, having an internet protocol (IP) address of an application server.

Example 41 includes the apparatus of example 34, further configured to process, for forwarding, the V2X message via the V2X interface to the V2X function to enable the V2X function to add an internet protocol (IP) address of an application server.

Example 42 includes the apparatus of example 41, further configured to process the V2X message received from the V2X function via the V2X interface having the IP address of the application server.

Example 43 includes the apparatus of example 42, further configured to process, for forwarding, the V2X message, having the IP address of the application server over an IP tunnel to a selected packet data network (PDN) gateway.

Example 44 includes the apparatus of example 34, further configured to: determine the V2X message is a V2X safety message according to the V2X identification information; broadcast the safety V2X message to a cell; unicast the safety V2X message to a cell; or multicast the safety V2X message to a cell.

Example 45 includes the apparatus of example 34, further configured to use a packet filter to map an internet protocol (IP) address to either an evolved Packet Service (EPS) bearer or into to a cell.

Example 46 includes the apparatus of example 34, wherein the V2X identification information is included in a MAC header, in a RLC header, or in a packet data convergence protocol (PDCP) header.

Example 47 includes the apparatus of example 34, wherein the vehicle-to-anything (V2X) communication is a vehicle-to-vehicle communication, vehicle-to-person communication, or vehicle-to-network communication.

Example 48 includes the apparatus of example 34, wherein the apparatus includes at least one of an antenna, a touch sensitive display screen, a speaker, a microphone, a graphics processor, an application processor, a baseband processor, an internal memory, a non-volatile memory port, and combinations thereof.

Example 49 includes an apparatus of a road-side unit (RSU) to support vehicle-to-anything (V2X) communication within a wireless communication network, the apparatus comprising one or more processors and memory configured to: identify a data packet transmitted from a user equipment (UE) as a V2X message; determine the V2X message is to be broadcast within a cell or forwarded to an V2X function via a V2X interface; and process the V2X message for transmission directly to the V2X function via a V2X interface or multicast, unicast, or broadcast the V2X message to the cell.

Example 50 includes the apparatus of example 49, further configured to identify an internet protocol (IP) address of a destination of the V2X message.

Example 51 includes the apparatus of example 50, further configured to determine the V2X message is a V2X safety message.

Example 52 includes the apparatus of example 51, further configured to: identify the V2X identification information is stored within the V2X message; determine the V2X message is the V2X safety message according to the V2X identification information within the V2X message; and broadcast the V2X safety message to each UE within the cell.

Example 53 includes the apparatus of example 49, further configured to read the V2X identification information.

Example 54 includes the apparatus of example 49, where the RSU is an eNodeB, the RSU is shared between a plurality of eNodeBs, or the RSU is a virtual computing instance of a plurality of virtual RSU pools shared between one or more eNodeBs.

Example 55 includes the apparatus of example 54, wherein the RSU has a one-to many relationship with the V2X function.

Example 56 includes the apparatus of example 49, further configured to process, for forwarding, the V2X message to a road-side unit (RSU) in communication with the V2X function and the eNodeB.

Example 57 includes the apparatus of example 48, further configured to determine the V2X message is to be forwarded to the function or broadcasted within a Cell according to an internet protocol (IP) address of the V2X message.

Example 58 includes the apparatus of example 57, further configured: process the V2X message received from the V2X function, having an internet protocol (IP) address of an application server; process, for forwarding, the V2X message via the V2X interface to the V2X function to enable the V2X function to add an internet protocol (IP) address of an application server; or process the V2X message received from the V2X function via the V2X interface having the IP address of the application server.

Example 59 includes the apparatus of example 49, further configured to process, for forwarding, the V2X message, having the IP address of the application server over an IP tunnel to a selected packet data network (PDN) gateway.

Example 60 includes the apparatus of example 59, wherein the V2X identification information is included in a MAC header, in a RLC header, or in a packet data convergence protocol (PDCP) header.

Example 61 includes a vehicle-to-anything (V2X) function within a wireless communication network, the V2X function comprising one or more processors and memory configured to: process a V2X message containing V2X identification information received directly from an eNodeB via a V2X interface; add an internet protocol (IP) address of a V2X application server; and process the V2X message for transmission to the eNodeB to enable the V2X message to be sent to the V2X application server.

Example 62 includes the V2X function of example 61, wherein the one or more processors and memory further configured to determine the V2X message is a V2X safety message.

Example 63 includes one or more transitory or non-transitory machine readable storage mediums having instructions embodied thereon for perform vehicle-to-anything (V2X) communication within a wireless communication network, the instructions when executed by one or more processors and memory perform the following: process a data packet containing V2X identification information received from an user equipment (UE); identify the data packet as a V2X message according to the V2X identification information; determine the V2X message is to be multicast, unicast, or broadcast within a cell or forwarded to an V2X function via a V2X interface; and process the V2X message for transmission directly to the V2X function via a V2X interface or multicast, unicast, and/or multicast, unicast, or broadcast the V2X message to the cell.

Example 64 includes the one or more transitory or non-transitory machine readable storage mediums of example 63, further comprising instructions when executed process the data packet received from the UE over a device-to-device (D2D) channel.

Example 65 includes an apparatus of an eNodeB operable to support vehicle-to-anything (V2X) communication within a wireless communication network, the apparatus comprising one or more processors and memory configured to: process a data packet containing V2X identification information received from an user equipment (UE); identify the data packet as a V2X message according to the V2X identification information; determine the V2X messages are to be forwarded to a V2X function; and process the V2X message for transmission directly to the V2X function via a V2X interface.

Example 66 includes the apparatus of example 65, further configured to process the data packet received from the UE over a device-to-device (D2D) channel.

Example 67 includes an apparatus of an eNodeB operable to support vehicle-to-anything (V2X) communication within a wireless communication network, the apparatus comprising one or more processors and memory configured to: process a data packet containing V2X identification information received from an user equipment (UE); identify the data packet as a V2X message according to the V2X identification information; determine the V2X messages are to be forwarded to a V2X function; and process the V2X message for transmission directly to the V2X function via a V2X interface.

Example 68 includes the apparatus of example 67, further configured to: process the data packet received from the UE over a device-to-device (D2D) channel; determine the V2X message is to be forwarded to the function or broadcasted within a Cell according to an internet protocol (IP) address of the V2X message; process, for forwarding, the V2X message to a road-side unit (RSU) in communication with the V2X function and the eNodeB; process the V2X message received from the V2X function, having an internet protocol (IP) address of an application server; or process, for forwarding, the V2X message via the V2X interface to the V2X function to enable the V2X function to add an internet protocol (IP) address of an application server.

Example 69 includes the apparatus of example 67 or 68, wherein the eNodeB is a road-side unit (RSU), or shares a road-side unit (RSU) with at least one alternative eNodeB.

In Example 70, the subject matter of Example 67 or any of the Examples described herein may further be configured to: process the V2X message received from the V2X function via the V2X interface having the IP address of the application server; process, for forwarding, the V2X message, having the IP address of the application server over an IP tunnel to a selected packet data network (PDN) gateway; or use a packet filter to map an internet protocol (IP) address to either an evolved Packet Service (EPS) bearer or into to a cell.

In Example 71, the subject matter of Example 67 or any of the Examples described herein may further be configured to: determine the V2X message is a V2X safety message according to the V2X identification information; or multicast, unicast, or broadcast the safety V2X message to the cell.

In Example 72, the subject matter of Example 67 or any of the Examples described herein may further include, wherein the V2X identification information is included in a MAC header, in a RLC header, or in a packet data convergence protocol (PDCP) header.

In Example 73, the subject matter of Example 67 or any of the Examples described herein may further include, wherein the vehicle-to-anything (V2X) communication is a vehicle-to-vehicle communication, vehicle-to-person communication, or vehicle-to-network communication.

In Example 74, the subject matter of Example 67 or any of the Examples described herein may further include, wherein the apparatus includes at least one of an antenna, a touch sensitive display screen, a speaker, a microphone, a graphics processor, an application processor, a baseband processor, an internal memory, a non-volatile memory port, and combinations thereof.

Example 75 includes an apparatus of a road-side unit (RSU) to support vehicle-to-anything (V2X) communication within a wireless communication network, the apparatus comprising one or more processors and memory configured to: identify a data packet transmitted from a user equipment (UE) as a V2X message; determine the V2X message is to be broadcast within a cell or forwarded to an V2X function via a V2X interface; and process the V2X message for transmission directly to the V2X function via a V2X interface and/or multicast, unicast, and/or broadcast the V2X message to the cell.

Example 76 includes the apparatus of example 75, further configured to: identify an internet protocol (IP) address of a destination of the V2X message determine the V2X message is a V2X safety message; identify the V2X identification information is stored within the V2X message; determine the V2X message is the V2X safety message according to the V2X identification information within the V2X message; broadcast, unicast, multicast the V2X safety message to each UE within the cell; or read the V2X identification information, wherein the V2X identification information is included in a MAC header, in a RLC header, or in a packet data convergence protocol (PDCP) header.

Example 77 includes the apparatus of example 75 or 76, wherein the RSU has a one-to many relationship between the V2X function, where the RSU is an eNodeB, the RSU is shared between a plurality of eNodeBs, or the RSU is a virtual computing instance of a plurality of virtual RSU pools shared between one or more eNodeBs.

In Example 78, the subject matter of Example 75 or any of the Examples described herein may further be configured to: process, for forwarding, the V2X message to a road-side unit (RSU) in communication with the V2X function and the eNodeB; determine the V2X message is to be forwarded to the function or broadcasted within a Cell according to an internet protocol (IP) address of the V2X message; process the V2X message received from the V2X function, having an internet protocol (IP) address of an application server; process, for forwarding, the V2X message via the V2X interface to the V2X function to enable the V2X function to add an internet protocol (IP) address of an application server; process the V2X message received from the V2X function via the V2X interface having the IP address of the application server; or process, for forwarding, the V2X message, having the IP address of the application server over an IP tunnel to a selected packet data network (PDN) gateway.

Example 79 includes a vehicle-to-anything (V2X) function within a wireless communication network, the V2X function comprising one or more processors and memory configured to: process a V2X message containing V2X identification information received directly from an eNodeB via a V2X interface; add an internet protocol (IP) address of a V2X application server; and process the V2X message for transmission to the eNodeB to enable the V2X message to be sent to the V2X application server.

Example 80 includes the V2X function of claim 79, wherein the one or more processors and memory further configured to determine the V2X message is a V2X safety message.

Example 81 includes one or more transitory or non-transitory machine readable storage mediums having instructions embodied thereon for perform vehicle-to-anything (V2X) communication within a wireless communication network, the instructions when executed by one or more processors and memory perform the following: process a data packet containing V2X identification information received from an user equipment (UE); identify the data packet as a V2X message according to the V2X identification information; determine the V2X message is to be multicast, unicast, or broadcast within a cell or forwarded to an V2X function via a V2X interface; and process the V2X message for transmission directly to the V2X function via a V2X interface or broadcast the V2X message to the cell.

Example 82 includes a device for performing vehicle-to-anything (V2X) communication within a wireless communication network, the device comprising: means for processing a data packet containing V2X identification information received from an user equipment (UE); means for identifying the data packet as a V2X message according to the V2X identification information; means for determining the V2X message is to be multicast, unicast, or broadcast within a cell or forwarded to an V2X function via a V2X interface; and means for sending the V2X message directly to the V2X function via a V2X interface or broadcast the V2X message to the cell.

Example 83 includes the device of examples 82, further comprising means for receiving, from the UE, the data packet over a device-to-device (D2D) channel or receive the data packets over a cellular interface.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module do not have to be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of an eNodeB operable to support vehicle-to-anything (V2X) communication within a wireless communication network, the apparatus comprising one or more processors and memory configured to:
   process a data packet containing V2X identification information that is received from a user equipment (UE);
   identify the data packet as a V2X message according to the V2X identification information;
   determine the V2X message is to be forwarded to a V2X function;
   process the V2X message for transmission directly to the V2X function via a V2X interface to enable the V2X function to add an internet protocol (IP) address of an application server.

2. The apparatus of claim 1, further configured to process the data packet received from the UE over a device-to-device (D2D) channel or process the data packets received over a cellular interface.

3. The apparatus of claim 1, wherein the eNodeB is a road-side unit (RSU).

4. The apparatus of claim 3, where the RSU is an eNodeB, the RSU is shared between a plurality of eNodeBs, or the RSU is a virtual computing instance of a plurality of virtual RSU pools shared between one or more eNodeBs.

5. The apparatus of claim 1, wherein the eNodeB shares a road-side unit (RSU) with at least one alternative eNodeB.

6. The apparatus of claim 1, further configured to process, for forwarding, the V2X message to a road-side unit (RSU) in communication with the V2X function and the eNodeB.

7. The apparatus of claim 1, further configured to determine the V2X message is to be forwarded to the V2X function or broadcasted within a Cell according to an internet protocol (IP) address of the V2X message.

8. The apparatus of claim 1, further configured to process the V2X message received from the V2X function, having an internet protocol (IP) address of an application server.

9. The apparatus of claim 1, further configured to process the V2X message received from the V2X function via the V2X interface having the IP address of the application server.

10. The apparatus of claim 1, further configured to process, for forwarding, the V2X message, having the IP address of the application server over an IP tunnel to a selected packet data network (PDN) gateway.

11. The apparatus of claim 1, further configured to:
   determine the V2X message is a V2X safety message according to the V2X identification information;
   broadcast the safety V2X message to a cell;
   unicast the safety V2X message to a cell; or
   multicast the safety V2X message to a cell.

12. The apparatus of claim 1, further configured to use a packet filter to map an internet protocol (IP) address to either an evolved Packet Service (EPS) bearer or into to a cell.

13. The apparatus of claim 1, wherein the V2X identification information is included in a MAC header, in a RLC header, or in a packet data convergence protocol (PDCP) header.

14. The apparatus of claim 1, wherein the vehicle-to-anything (V2X) communication is a vehicle-to-vehicle communication, vehicle-to-person communication, or vehicle-to-network communication.

15. The apparatus of claim 1, wherein the apparatus includes at least one of an antenna, a touch sensitive display screen, a speaker, a microphone, a graphics processor, an application processor, a baseband processor, an internal memory, a non-volatile memory port, and combinations thereof.

* * * * *